US008887058B2

(12) United States Patent
Gewecke et al.

(10) Patent No.: US 8,887,058 B2
(45) Date of Patent: Nov. 11, 2014

(54) MEDIA MANAGEMENT FOR MULTI-USER GROUP

(75) Inventors: Thomas Gewecke, Portland, OR (US);
Justin Herz, Los Angeles, CA (US);
Essam Mahmoud, Glendale, CA (US);
Maria Seidman, New York, NY (US)

(73) Assignee: Warner Bros. Entertainment Inc.,
Burbank, CA (US)

( * ) Notice: Subject to any disclaimer, the term of this patent is extended or adjusted under 35 U.S.C. 154(b) by 561 days.

(21) Appl. No.: 12/911,594

(22) Filed: Oct. 25, 2010

(65) Prior Publication Data

US 2012/0102410 A1    Apr. 26, 2012

(51) Int. Cl.
*G06F 3/01*    (2006.01)
*G06F 15/16*    (2006.01)

(52) U.S. Cl.
USPC ........... 715/738; 715/741; 715/745; 715/747; 715/733

(58) Field of Classification Search
USPC .......................... 715/738, 715, 745, 747, 733
See application file for complete search history.

(56) References Cited

U.S. PATENT DOCUMENTS

| | | | |
|---|---|---|---|
| 2003/0060910 A1* | 3/2003 | Williams et al. | 700/91 |
| 2005/0262151 A1* | 11/2005 | Plastina et al. | 707/104.1 |
| 2007/0033220 A1* | 2/2007 | Drucker et al. | 707/103 R |
| 2008/0059478 A1* | 3/2008 | Craine | 707/10 |
| 2010/0100899 A1 | 4/2010 | Bradbury et al. | |
| 2010/0228740 A1* | 9/2010 | Cannistraro et al. | 707/748 |
| 2011/0179019 A1* | 7/2011 | Amer-Yahia et al. | 707/723 |
| 2011/0288946 A1 | 11/2011 | Baiya et al. | |
| 2012/0036482 A1* | 2/2012 | Haynes et al. | 715/838 |

OTHER PUBLICATIONS

Martin Halvey and Mark T. Keane, an Assessment of Tag Presentation Techniques <http://www2007.org/htmlposters/poster988/>, poster presentation at WWW 2007, 2007.
Gilles Deleuze, Felix Guattari (1992).Tausend Plateaus. Kapitalismus and Schizophrenie.ISBN <http://en.wikipedia.org/wiki/International_Standard_Book_Number>    3-88396-094-2 <http://en.wikipedia.org/wiki/Special:BookSources/3-88396-094-2>.

(Continued)

*Primary Examiner* — Weilun Lo
*Assistant Examiner* — Peiyong Weng
(74) *Attorney, Agent, or Firm* — Jonathan Jaech; Novak Druce Connolly Bove + Quigg LLP

(57) ABSTRACT

Media management for multi-user groups includes methods for determining a numeric score for recorded content being one of a popularity score or a relevance score, and for displaying a content library as an array of images each sized in accordance with its popularity score. The methods may also include social group features whereby a user may compare her content library with other libraries in her social group, and view relative popularity of content titles in the other libraries. The system includes numerous other features for content exploration, acquisition and management. An apparatus for performing the method comprises a processor coupled to a memory, the memory holding instructions for performing steps of the method as summarized above. Various aspects of the system may be implemented as a server or a client.

24 Claims, 31 Drawing Sheets

(56) References Cited

OTHER PUBLICATIONS

Jim Flanagan's SearchReferral Zeitgeist was available at archive.org <http://web.archive.org/web/20041204231120/http:/twiki.tensegrity.net/bin/view/Main/SearchReferralZeitgeist> but has since been blocked. In the comments of a blog entry <http://www.37signals.com/svn/archives/000937.php>, a user identified as Steve Minutillo attribute the idea to Jim Flanagan, stating that Flanagan's site had such displays in 2002.
Bielenberg, K. and Zacher, M., Groups in Social Software: Utilizing Tagging to Integrate Individual Contexts for Social Navigation <http://bielenberg.info/thesis.pdf>, Masters Thesis submitted to the Program of Digital Media, Universitat Bremen (2006).
<http://en.wikipedia.org/wiki/Tag_cloud> Knautz, K., Soubusta, S., & Stock, W.G. (2010).Tag clusters as information retrieval interfaces <http://www.phil-fak.uni-duesseldorf.de/fileadmin/Redaktion/Institute/Informationswissenschaft/stock/Knautz_Soubusta_Stock.pdf>. Proceedings of the 43rd Annual Hawaii International Conference on System Sciences (HICSS-43), Jan. 5-8, 2010. IEEE Computer Society Press (10 pages).
Kamel Aouiche, Daniel Lemire, Robert Godin,Collaborative OLAP with Tag Clouds: Web 2.0 OLAP Formalism and Experimental Evaluation <http://arxiv.org/abs/0710.2156>, WEBIST 2008, 2008.
Article: Free tag cloud generator script for PHP web pages <http://www.softwaremastercenter.com/free-tag-cloud-generator-script.html> Retrieved Nov. 17, 2009.
Lohmann, S., Ziegler, J., Tetzlaff, L. Comparison of Tag Cloud Layouts: Task-Related Performance and Visual Exploration <http://www.uni-due.de/~s400268/Lohmann09-interact.pdf>, T. Gross et al. (Eds.): INTERACT 2009, Part I, LNCS 5726, pp. 392-404, 2009.
Hassan-Montero, Y., Herrero-Solana, V. Improving Tag-Clouds as Visual Information Retrieval Interfaces <http://www.nosolousabilidad.com/hassan/improving_tagclouds.pdf>, Oct. 2006.
Owen Kaser and Daniel Lemire,Tag-Cloud Drawing: Algorithms for Cloud Visualization <http://arxiv.org/abs/cs10703109>, Tagging and Metadata for Social Information Organization (WWW 2007), 2007.
Salonen, J. 2007.Self-organising map based tag clouds—Creating spatially meaningful representations of tagging data <http://matriisi.ee.tut.fi/hypermedia/julkaisut/2007-salonen-som-clouds.pdf>. Proceedings of the 1st OPAALS conference, Nov. 26-27, 2007, Rome, Italy.
Apel, Warren."ManyEyes Visualization and Commentary: World Population Data Cloud." <http://services.alphaworks.ibm.com/manyeyes/view/Slk76IsOtha6gFGgix3cl2->. Retrieved Aug. 26, 2007.
Wattenberg, Martin. "ManyEyes Visualization: Ad cloud" <http://services.alphaworks.ibm.com/manyeyes/view/Sh3S9FsOtha6OdUrBNWFF2->. Retrieved Mar. 12, 2007.
Lamantia, Joe."Text Clouds: A New Form of Tag Cloud?" <http://www.joelamantia.com/blog/archives/tag_clouds/text_clouds_a_new_form_of_tag_cloud.html>. Retrieved Sep. 11, 2008.
Mehta, Chirag. "US Presidential Speeches Tag Cloud" <http://chir.ag/phernalia/preztags/>. Retrieved Sep. 11, 2008.
"Collocate cloud" <http://www.scottishcorpus.ac.uk/corpus/search/collocatecloud.php>. Retrieved Dec. 5, 2008.
Jakob Voss:Collaborative thesaurus tagging the Wikipedia way. Apr. 2006 [1] <http://arxiv.org/abs/cs/0604036>.
"Monthly wiki page Hits for en.wikipedia" <http://wikistics.falsikon.de/latest/wikipedia/en/topics/Vital_articles.htm>.
Wikistics.falsikon.de <http://Wikistics.falsikon.de>. Aug. 31, 2009. Retrieved Jul. 27, 2013.
E-mail from William Grecia dated Aug. 5, 2013.

* cited by examiner

MEDIA MANAGEMENT FOR MULTI-USER GROUP

BACKGROUND

Currently, audio and audio-video content reaches the consumer via various different modes: transient exposure using a pay-per-view or advertising-funded model, acquisition of reusable copies of content encoded on a tangible media or device, or an intermediate mode of renting recorded copies for a limited time period. Consumers of content typically consume content using all of the foregoing consumption modes, and using various distribution channels or technology platforms. For example, a consumer acquiring digital copies of audio-video content such as movie titles or serial episodes may acquire some copies on a DVD medium, some on a Blu-ray medium, and some by digital download to a designated local or remote storage medium, depending on the consumer's choice of device to access the content. At the same time, the consumer may consume other content without retaining a copy, such as by watching a television broadcast, streaming content over a network, or attending a showing at a theater.

In short, the consumer has more choices than ever before regarding the mode and medium for consuming recorded content. At the same time, the cost to the consumer of acquiring individual copies has continued to decrease, while the availability of different content titles and the quality of the typical viewing experience has continued to improve. As a result, it is not unusual for a typical consumer today to acquire hundreds of content copies to hold as a content library for personal use. Accordingly, an increasing number of people have an interest in managing fairly extensive libraries of recorded content in multiple formats, including selecting new titles for acquisition, rental, or one-time viewing. However, computing tools and systems for personal audio-video library management lack convenience and certain desirable features useful for consumers and content providers.

SUMMARY

It would be desirable, therefore, to provide a technology whereby a computer can be used to provide a personal media manager system providing features and benefits for managing recorded content acquired for different platforms and via different distribution channels, for locating additional content that is likely to be of interest, and for obtaining ancillary information about recorded content of interest to the user. The technology may be implemented as a method performed using one or more computers configured for serving information over a network, such as a wide area network, to perform the functions of the media manager hub. The technology may be implemented as encoded instructions on a computer-readable medium, which, when executed by one or more processors of a computer, cause the computer to perform the novel method to achieve results as described herein. Aspects of the technology may be implemented as an apparatus, for example a computer server, having a processor and memory, wherein the memory holds code for causing the server to perform the novel method to achieve results as described herein. Aspects of the technology may similarly be implemented as a client apparatus or device. The present disclosure therefore discloses illustrative steps of a method as exemplifying the novel technology, which is not limited to a method and may be implemented in various other ways such as just described.

An aspect of the technology may include maintaining user-defined lists of content identifiers in a computer memory for corresponding user accounts, in response to user input defining collections of recorded audio and video works for respective ones of the user accounts. For example, a computer server may maintain the lists and obtain the user input from multiple clients. The user-defined lists of content identifiers may be records reflecting content libraries for different users; for example, titles of recorded works such as motion pictures and episodes of serial programs, recorded in various media such as DVD, Blu-ray, or digital download to a designated medium or memory device. Each client device may receive user input identifying permitted social group members for the authorized user, and transmit identifiers for the permitted social group members to a server for developing social group information for the authorized user.

Another aspect of the technology may include determining popularity scores each of which pertains to a different content identifier, based on frequencies with which the ones of the content identifiers appear in the user-defined content lists. This may be performed by the server, by the client, or by some other processor with access to the content lists. For example, if the relevant database includes 100 content lists and a particular title appears in 75 of the lists, the content title may be assigned a content score of 75%. In addition, popularity may be computed by weighting different content lists differently, for example weighting lists from users with similar user profiles more heavily than lists for users with dissimilar profiles. According, the technology may provide the popularity scores to client devices for display to users and other uses as described herein.

Another aspect of the technology may include determining a relevancy score indicating a content title's predicted relevance to an identified system user. For example, a relevancy score may be determined for "User A" based on her behavior in interacting with one or more system applications, titles indicated as owned, rented, borrowed, viewed or desired in a content database for the user, defined user preferences such as genre or actor preferences, and terms used in search queries from the user. The relevancy score may comprise a numerical estimate, for example a percentage score, produced by a system algorithm using input such as exemplified above. The score may be labeled and interpreted as indicating a likelihood that the identified user will like a particular content title. For example, a score of 80% may be interpreted as indicating an 80% probability that a user will enjoy viewing a particular title. Any useful form of numerical score enabling a comparison between scores may be used.

Another aspect of the technology may include providing image data to each of the client devices to enable display of distinct images arranged in a matrix of images. Each image in the matrix may be selected to represent a corresponding one of entries in a user content list, so that each matrix represents contents of corresponding ones of the user-defined lists. A client device may arrange a matrix of images representing contents of one of the user-defined lists of content identifiers for an authorized user, so that each image in the matrix corresponds to a different one of the content identifiers. Display size of each image in the matrix may determined at least in part by a popularity score determined for each content identifier, with more popular titles being displayed at a relatively larger size than relatively less popular titles. In the alternative, or in addition, display size of each image in the matrix may be determined at least in part by a relevancy score determined for each content identifier and each user, with higher scoring titles displayed at a relatively larger size than lower scoring titles. In some embodiments, each of the distinct images comprises a substantially rectangular two-dimensional cover image for a content title, and the matrix of images comprises tiled arrangement of the cover images each sized in accordance with its corresponding popularity score.

A client device may output information for display of a user interface on the client device, comprising the matrix of images. The user interface may be used by the client to perform a variety of functions, including soliciting and receiving user input and providing information to the user. For example, the client device may use the interface to obtain user input indicating addition or removal of a recorded audio or video work from a content list. The client or server may then augment or update one of the user-defined lists of content identifiers for the authorized user, in response to the user input. For further example, the client may respond to user selection of an image in the matrix of images to display further information about a recorded audio or video work indicated by the selection of the image.

In another aspect, a server may maintain social group information for each of the user accounts, in response to user input identifying permitted social group members for respective ones of the user accounts with confirmation from the permitted social group members. For example, a first user may identify other users registered with the server, and the server may in response send a message requesting confirmation to the identified users. In response to receiving confirmation from a user, the server may create a record indicating that the confirming user is a member of the first user's social group.

Among other things, the social group record for the first user may be used to enhance information and enjoyment of the first user's content library. For example, a method implemented by the server may comprise selecting the user-defined content lists for determining the popularity scores for a first user consisting of the user-defined content lists for permitted social group members of the first user only. Thus, the user can see how popular a particular content title is with her friends. In the alternative, or in addition, the method may further comprise selecting the user-defined content lists for determining the popularity scores for a first user to include user-defined content lists for users that are not in the permitted social group for the first user. These additional content lists may be selected by profile matching to find content lists from users matching or similar to a demographic profile.

In some embodiments, the server may provide information about user-defined content lists maintained for permitted social group members of a first user to a client device for the first user. For example, the server may provide the information about user-defined content lists comprising copies of the user-defined content lists. The client may provide an option in the user interface for the authorized user to view the user-defined content lists for the permitted social group members. Thus, the first user may, with permission from members of her social group, browse the content libraries of her friends.

In some embodiments, the client, the server or client may calculate similarity scores for each of the permitted social group members relative to the first user, wherein the similarly scores measure similarity between the user-defined content lists for each of the permitted social group members and the user-defined content list for the first user. If computed at the server, it may serve the similarity scores to a client device for display to the first user. The similarity score provides a measure by which the user can quickly determine a degree of similarity between her collection and that of other users.

In some embodiments, the server or client may identify suggested new content that is not identified on the user-defined content list for the user and is identified on similar ones of the user-defined content lists maintained for permitted social group members of the user. The client may display the suggested new content to the user for purchase consideration or download. The client may also provide access to ancillary information about the new content, for example, trailers, story synopsis, news and reviews, to assist the user in making a decision to purchase or download the content.

Other features of the present technology should become apparent from the following detailed description in conjunction with the accompanying drawings, which drawings are summarized below.

DRAWINGS

DETAILED DISCLOSURE

Figure 1:
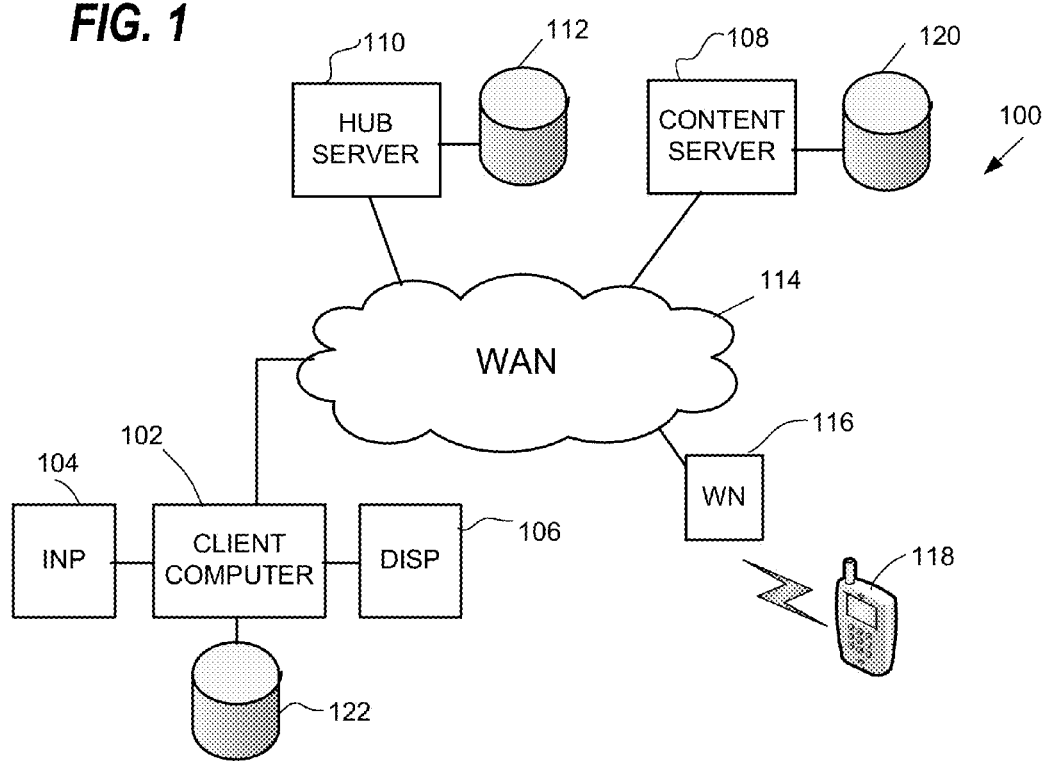
FIG. 1 is a block diagram showing an example of a system for implementing a media manager system with features as described herein.

An example of a system 100 for providing a multimedia system is shown in FIG. 1. The system may comprise a client computer 102, for example, a personal computer, laptop computer, notebook computer, tablet computer, smart phone, set top box, game console, television with a network interface and digital processor, or the like, for accessing digital content using a display device 106 to view video output from the client 102, in response to input from an input device 104. Client 102 may comprise a processor, memory, network interface, and computer graphics display driver for providing video output to a display device 106. A user interface, data and optionally digital audio-video content may be encoded on a computer-readable medium 122 coupled to the client 102, such as, for example, a magnetic, optical, or electronic data storage device or medium. The computer-readable medium 122 may hold encoded instructions for performing certain actions as described herein, for example performing user interface functions as described herein.

System 100 may comprise multiple clients similar to, or essentially the same as, client 102, independently operated by different users. These multiple clients may operate to provide, in the aggregate, content library data used to assess popularity of content titles and measure similarities between content libraries. For example, system 100 may further comprise one or more wireless networks 116 coupled to a wide area network (WAN) 114, for communicating with one or more wireless clients 118. It is contemplated that a wireless client 118 may include components that are generally the same as or similar to client 102, and perform the same or similar functions, although perhaps using a different operating system.

The client 102 may further comprise a network interface for communicating via the WAN 114, for example, the Internet. Via such an interface and network, the client may communicate with media manager system server 110 operating a media management system application responsive to input from multiple clients, such as clients 102 and 118.

The media management system server 110 may be coupled to a database 112, which may store content library, user profile, security and other data collected from multiple clients as described herein in association with identifiers for data files holding digital audio-video content. The stored data may include data collected from multiple clients like client 102, and data developed using collected data, for example, metadata about selected content titles, news articles and reviews, trailers, cover images and still shots, and user profile data. The media management system server 110 may also perform popularity measurements for content titles using library data, serve cover images and popularity data to clients for use in client user interfaces, and perform other functions or methods described herein.

The media management system server 110, the client 102, or both, may determine relevancy scores for particular content titles, by processing data specific to respective system users. User data used for determining a relevancy score of a content title may include, for example, an identified user's behavior in interacting with one or more system applications, titles indicated as owned, rented, borrowed, viewed or desired in a content database for the user, user preferences in various categories such as actor or genre, and terms used in search queries from the user. Relevancy scores for content titles pertinent to a specific user may be transmitted to and/or stored on the client 102 for use in generating client user interfaces or other functions as described elsewhere herein.

System 100 may further comprise one or more content servers 108 coupled to one or more data storage components 120 holding digital audio-video files and associated metadata. The digital audio-video data comprises content titles for accessing via clients such as clients 102 and 118. As used herein, a "content title" refers generally to a discrete recorded audio-video work that is assigned a recognizable title for identification purposes, for example, "The Dark Knight (2008)" or "The Office, Season 1 Episode 1." Clients may stream or download recorded audio-video files from the one or more content servers 108 to view and listen to recorded content. Optionally, the media management system server 110 may automatically receive notification from the content server 108 when a content title is downloaded to a client device for a user account, and in response to receiving the notification, the management system server may update the user-defined content list for the user account to include the new content title. In the alternative or in addition, users may update their respective content libraries by manually inputting or selecting objects in a user interface.

As noted above, the client 102 may operate a user interface, through which functions of a media manager system may be delivered to a user. The user interface may be implemented as web pages accessed via a browser application operating on the client, and served from the media management system server 110. In the alternative, the client 102 may run a special purpose user interface application that communicates with the management system server 110. Either way, the user experience provided by the user interface may be as exemplified by screenshots depicted in FIGS. 2-24, which are described below.

Figure 2:
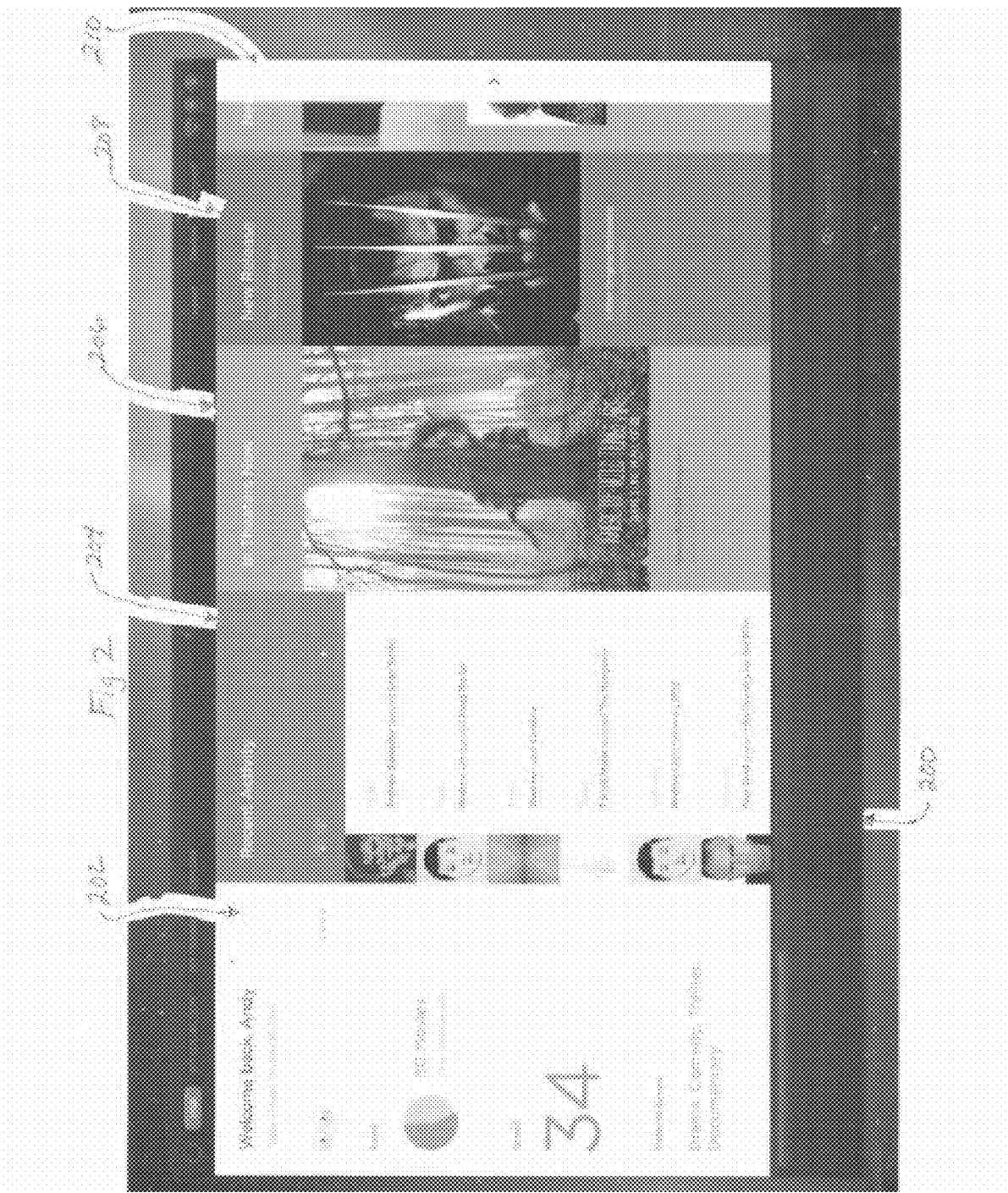
FIGS. 2-24 are examples of screen shots for a client user interface, illustrating features of a media manager system method and system.

FIG. 2 shows an example of a home screen 200 for a user interface page or application of the media management system. The home screen is arranged to facilitate user access to various different functions of the media management system and to provide a personalized experience for the user. Many objects depicted in the home screen and other screens of the user interface may be configured as active links to other content or to functional objects such as dialog boxes, forms, or the like. The leftmost column 202 shows personalized information, for example a user name "Andy" and user profile information, such as a number of content titles in the user's collection, and percentage rated by the user, a number queued for future viewing or purchase, and the user's preferred genres.

The next column 204 shows recent activity for members of the user's media management system social group or online "friends." These members are other users of the media management system system that have been confirmed via a mutual acceptance process, for example, an invite/accept process as known in social networking applications, to be friends of the user. The media management system may track activity of all users, and report activity of each user's friends to the user. Activity may include actions such as adding a content title to a collection, rating a content title, queuing a content title, or posting a message.

The next column 206 shows information for one of more content titles currently showing in theaters. Similarly, the rightmost column 208 shows information for content titles newly released on optical media or for digital download. The title in either column 206 or 208 may be ordered according to a user-specific relevancy score for each title. The relevancy score may be determined using a recommendation engine or algorithm based on certain user data as discussed above. For example, new release content titles in column 208 may be rank ordered according to relevancy score for the user, with the first title in the column having the highest relevancy score for the current user, the second title having the second highest relevancy score, and so forth.

Figure 3:
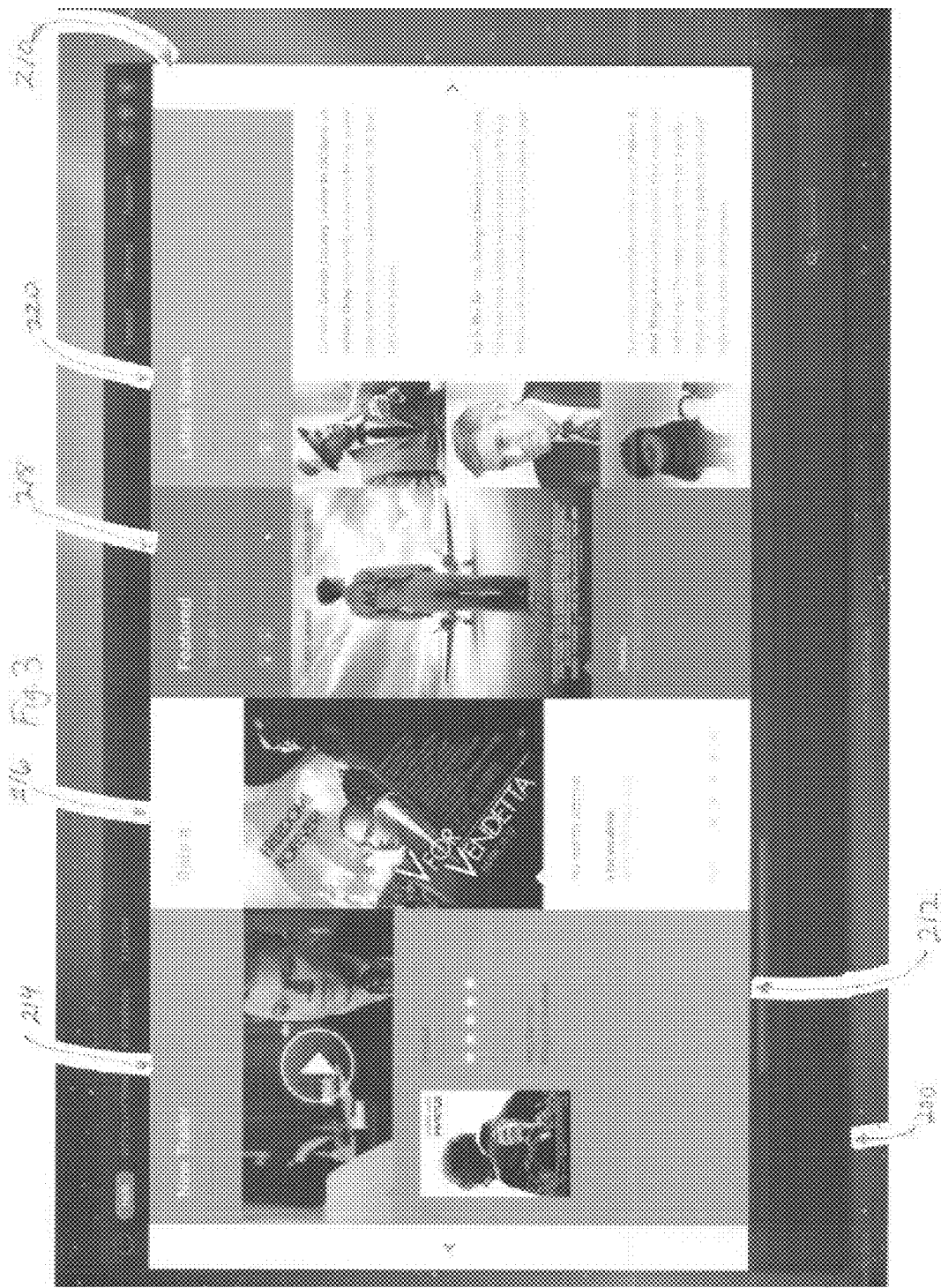
Figure 4:
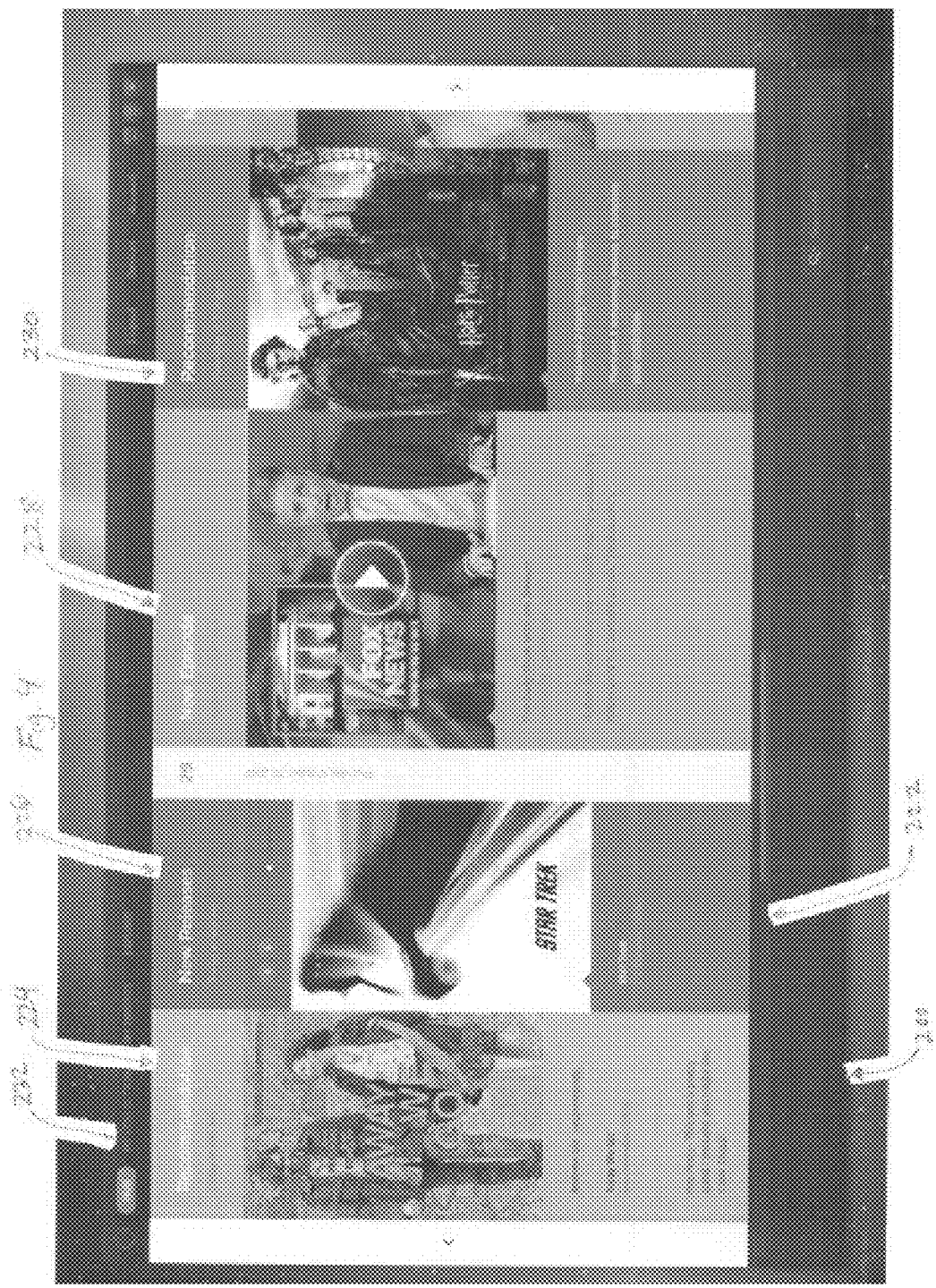
Figure 5:

A scroll bar 210 enables scrolling to a further part 212 of the home screen 200, shown in FIG. 3. Column 214 provides links to new trailers for upcoming theatrical releases. Column 216 provides a link to a rating form or other object for inputting a user rating of a recently viewed content title. Column 218 provides a link for more information on a system-featured content title. Column 220 provides a link to industry news regarding various content titles. A second further portion 222 of the home screen 200, as shown in FIG. 4, may be accessed via the right scroll bar 210. Column 224 displays a recommendation for a content title from a social group member of the user. Column 336 provides notification of another newly released content title. Column 228 provides notification of a newly released serial episode, with a link to enable a streamed download.

Column 230 provides a recommendation for a content title, using relevancy scores for content titles based on user information as previously described. In the alternative, or in addition, the recommendation may be a direct suggestion or recommendation from another user, such as another user recognized as a friend. For example, "User A" may input a recommendation and designate "User B" as a recipient, using a system interface. In response to the input, the client for User A may transmit the recommendation to the system server which may collect recommendations from various users and provide the received recommendations to the appropriate clients for the intended recipients. When User B logs into the system, the user interface for User B may display the recommendation from User A in column 230 or elsewhere. Collectively, FIGS. 2-4 illustrate features and functions that may be provided to the user as part of the user interface for the media management system.

The home screen 200 may include a link 232 through which a user may select one of more collection screens 234. Screen 234 includes a tiled matrix of cover images 236. Each cover image (e.g., cover image 238) in the matrix 236 is substantially the same rectangular size, and the images are tiled in some predetermined order as selected by the user, for example, alphabetical, by release date, or by most recent viewing date. Each cover image may be formatted as a link to further objects for performing other operations, as will be described in more detail below. The content titles represented by the cover images may include recorded works provided on an optical media such as DVD or Blu-ray, or digitally downloaded to a memory device accessible to the user. In the illustrate embodiment, the matrix of images 236. The user may scroll through the matrix 236 using a scroll bar 210.

Figure 6:

FIG. 6 shows an options window 240 that the client may open in response to user selection of an options link 242. The options window may provide objects for enabling the user to filter or sort the cover images in the matrix 234. For example, the objects may enable the user to filter the displayed cover images by any combination of DVD, Blu-ray, digital copy, rental, available on mobile, on the web, or not owned (following). Each of these categories, except for "following" refers to a medium or channel through which the underlying content is accessible to the user. For example, filtering by "DVD" would show only those titles to which the user has indicated possession of a DVD copy, while filtering by "available on mobile" would show only those titles to which the user possesses viewing rights via one or more mobile devices. "Following" refers to titles that the user has added to his content list, for which the user does not yet have access rights. For further example, the options window may be used to cause the client to sort the display order of cover titles in the matrix alphabetically, by release date, by date watched, or by rating. In response to user selection of options, the client may filter and sort the arrangement of cover titles in the matrix of images 236.

Figure 7:

The matrix of images may also be filtered according to user-determined parameters used to create subsets of a user's content list. For example, in response to user selection of a "Lists" link 244 as shown in FIG. 7, the client may cause a "Lists" window 246 to appear in the user interface. In response to user selection of one of the links 250 to a subset of the user's entire collection, the client may cause the matrix 236 to include only cover images for content titles included in the subset. For example, in response to user selection of a "Favorites" link, the client may display the matrix 236 including only cover images for content titles that the user has designates as being favorite. In response to user selection of a "create list" link 248, the client may provide a window or other object to appear, enabling the user to configure a new subset list.

Figure 8:
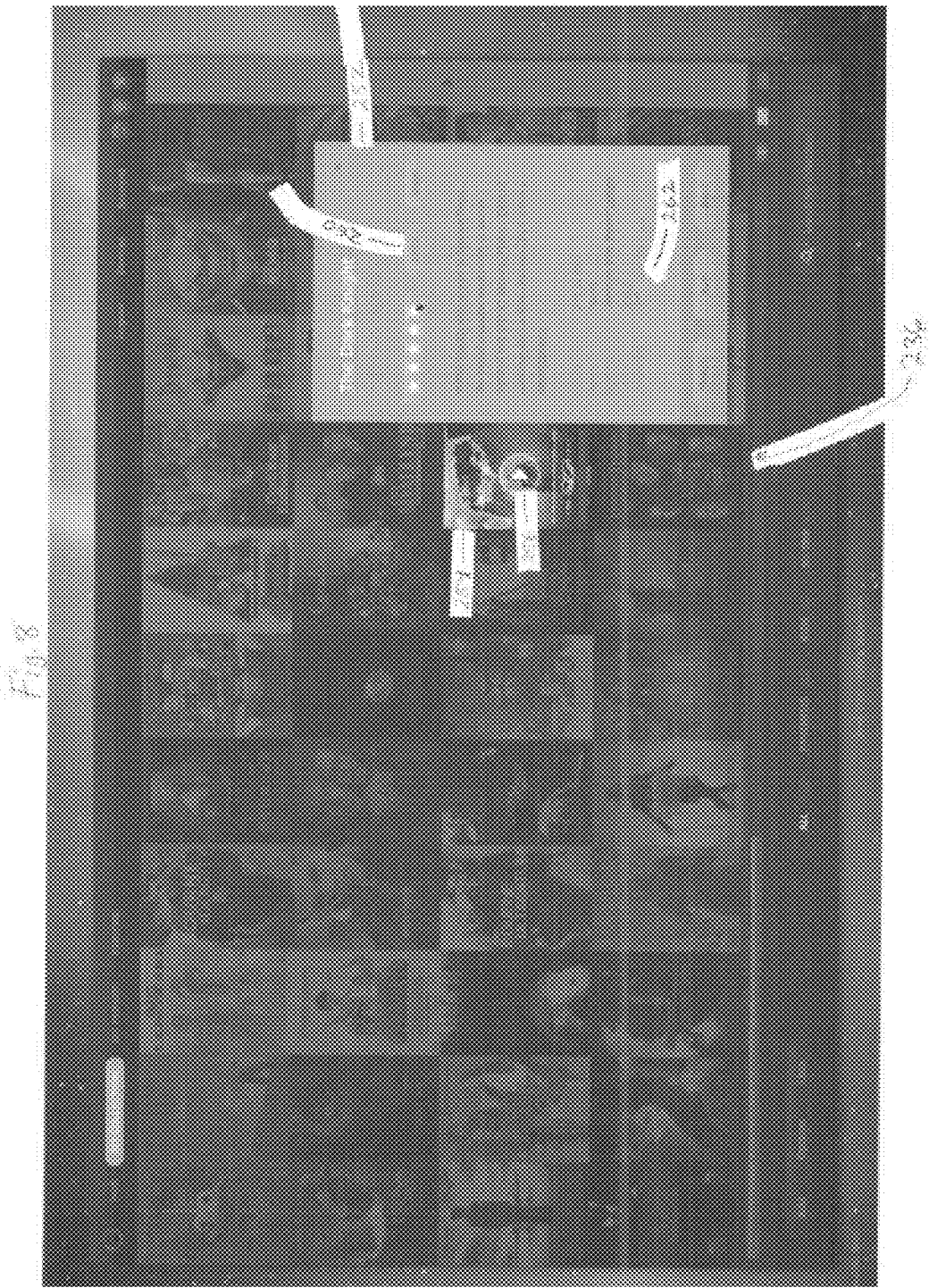
Figure 9:
Figure 10:

The client may format individual cover images in the matrix 236 as links to further objects. For example, as shown in FIG. 8, in response to user selection of a cover image 254, the client may highlight the cover image and, in response to determining that the client has access to a playable copy of the associated content title, display a "play" icon 256. In addition, the client may cause a popup window 252 to appear in the user interface window. The popup window 252 may provide further information about the content title represented by the cover image 254, for example, viewing rating, plot synopsis, MPAA rating, length, and so forth, as well as links to the user lists, to enable sharing, watching, buying or renting. Further in response to user selection of a "lists" link 260, the client may cause a second popup window 258 to appear in the user interface, as shown in FIG. 9. The window 258 may include one or interactive objects enabling the user to assign the content title represented by cover image 254 to one or more lists. For example, as shown in FIG. 9, the user may assign the title "The Dark Knight (2008)" to one or more lists including "Favorites," "Kids," "NY Trip," and "New List." Further in response to user selection of an "edit ownership" link 262, the client may cause a third popup window 264 to appear in the user interface, as shown in FIG. 10. The window 264 may include one or more interactive objects enabling the user to indicate one or more media formats owned by the user, for the content title associated with the highlighted cover image 254. For example, the user may select different objects to indicate ownership of "The Dark Knight" in DVD, Blu-ray, or digital download formats. In response to user selection indicating a change in ownership, the client may update the user's content list to reflect the new information, transmit the new information to the management system server, or both.

Figure 11:
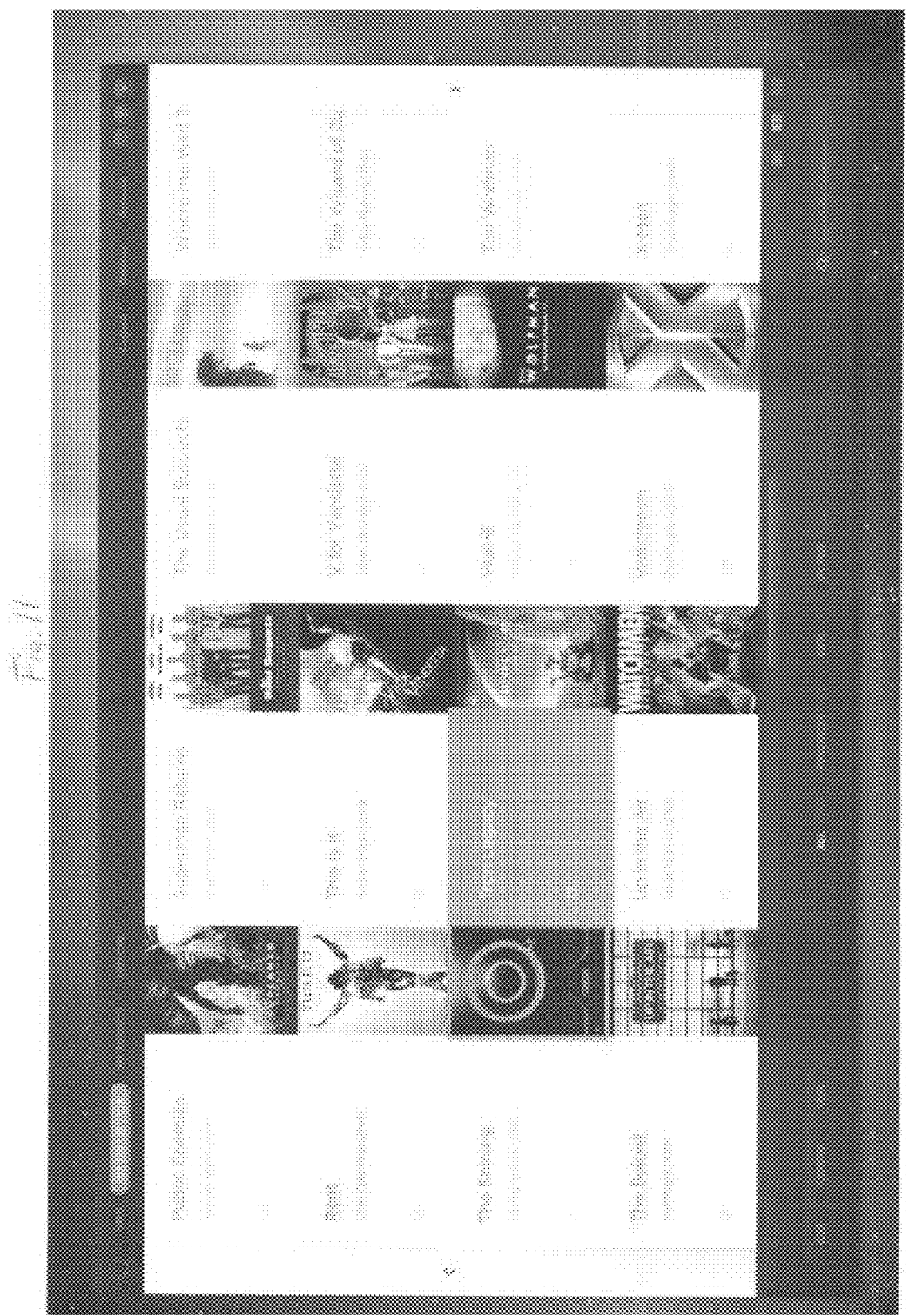
Figure 12:
Figure 13:
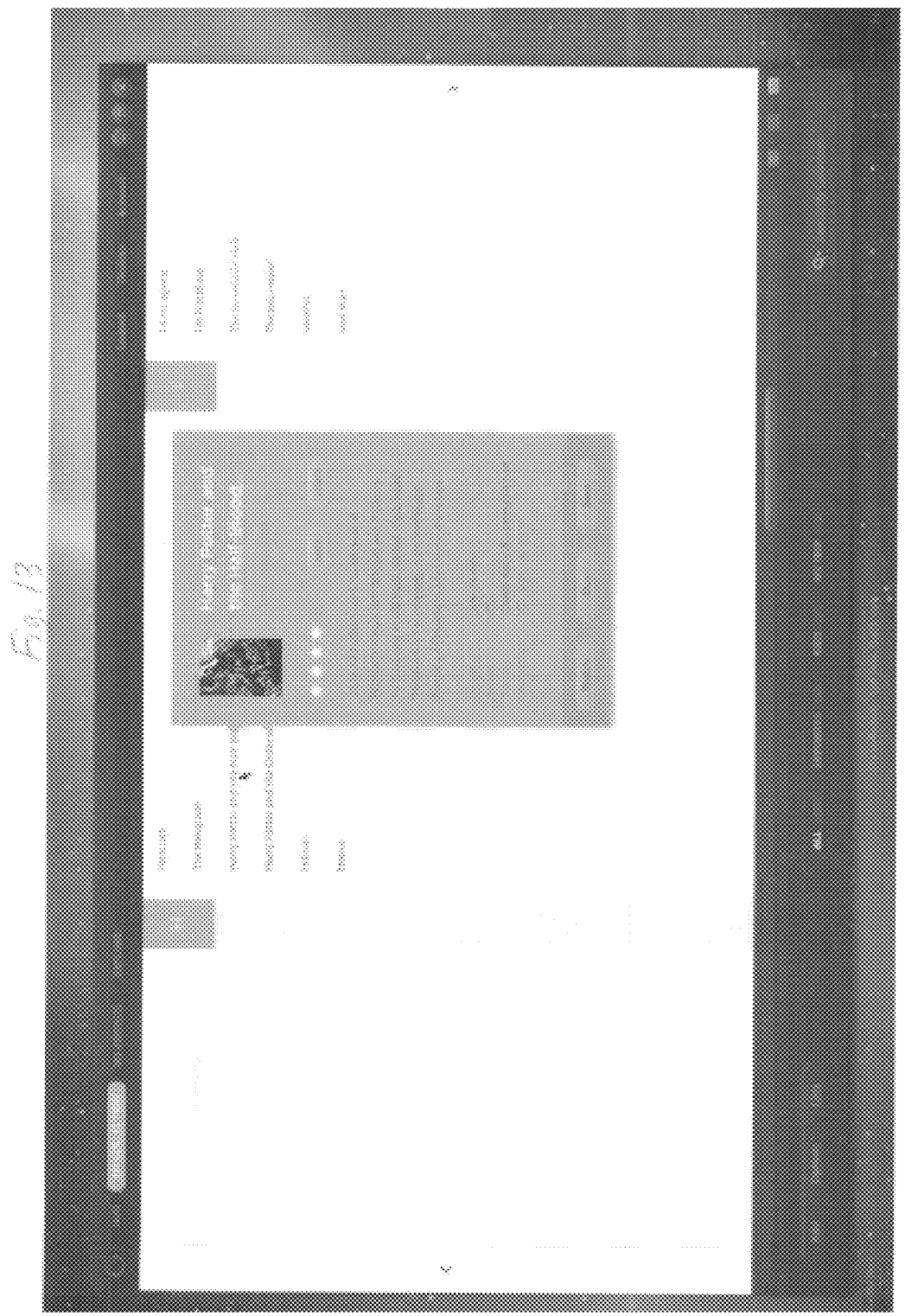

The client may display a content list in various different arrangements, besides an image matrix. As shown in FIG. 11, a content list may be displayed in a scrollable dual-column format. This format displays a descriptive title for each entry, in addition to the cover image. As shown in FIG. 12, a content list may be displayed in a scrollable single-row format. The top image 266, here an image for the movie "Tron," may be designated as the current active image, with images ahead and behind shown in successively smaller partial view. This format may be especially useful for display on small screens such as used in mobile devices, when the individual cover images such as used in the image matrix 236 may be smaller than desired. As shown in FIG. 13, the client may display a content list in a traditional text list format, here shown organized alphabetically into groups.

Figure 14:

FIG. 14 shows a special type of image matrix 268 comprised of differently-sized, non-overlapping tiles filling the display space without any gaps between the tiles. The tiles are displayed in definite sizes so as to fit together in the depicted manner. For example, a smallest tile size, as exemplified by tile 274, is rectangular with dimensions n×m, wherein "n" and "m" are some non-zero integer number of pixels, such as, for example, between about 30 and 120 pixels for a screen resolution of 800×600 pixels. A larger, intermediate tile size, as exemplified by tile 276, may be displayed at an integral multiple of the smallest tile, for example, 2n×m, or to preserve equal proportions in tile size, 2n×2m (4 times larger than the smallest tile). A largest tile size, as exemplified by tile 272, may similarly be displayed as the next integral multiple, for example 3n×3m (9 times larger than the smallest tile). By using tile sizes in integral multiples, the entire area of the image matrix 268 can be filled with cover images, without empty space or background imagery. This image matrix may be displayed in response to user selection of a "my friends" link 278.

The client may select the tile size for display of a cover image to convey information about each associated content title. For example, the tile size may be selected to convey information about the popularity of each title in the user's social group, popularity in any other user group, or relevance score for each title with respect to the user. Popularity for a particular title may be calculated, for example, as the number of content lists that include the title, divided by the total number of content lists to obtain a number in the range of 0% to 100%, inclusive. A "relevance score" as used herein refers to a numeric measure of predicted relative interest by the user in a content title based on data previously collected concerning user preferences and use of the content management system. A relevance score for each of multiple content titles may be determined in any suitable way as previously discussed. Popularity, relevance score or other parameter or combination of parameters may be mapped to tile size using mapped parameter ranges; for example 0%-50% mapped to the smallest tile size; 51%-75% to the intermediate tiles size; and >75% to the largest tile size. Of course, other range values and a greater or smaller number of tile sizes may also be used.

Figure 15:

The user interface may also present scrollable list 270 displaying information about the user's social group members' library collection. For example, the system may calculate a similarity measure between the respective group members' collections and the user's collection, as shown in the right portion of scrollable list 270. More detailed information about the displayed members collections may be provided in response to user selection of one of the members in the scrollable list 270. For example, in response to user selection of the member "Andrew Borovsky," the client may display a friend's collection screen 280, as shown in FIG. 15. The friend's collection screen 280 may display the content list for the friend, using any suitable format as disclosed herein, and additional information as shown on the left of the screen 280 regarding general aspects of the friend's collection.

Figure 16:
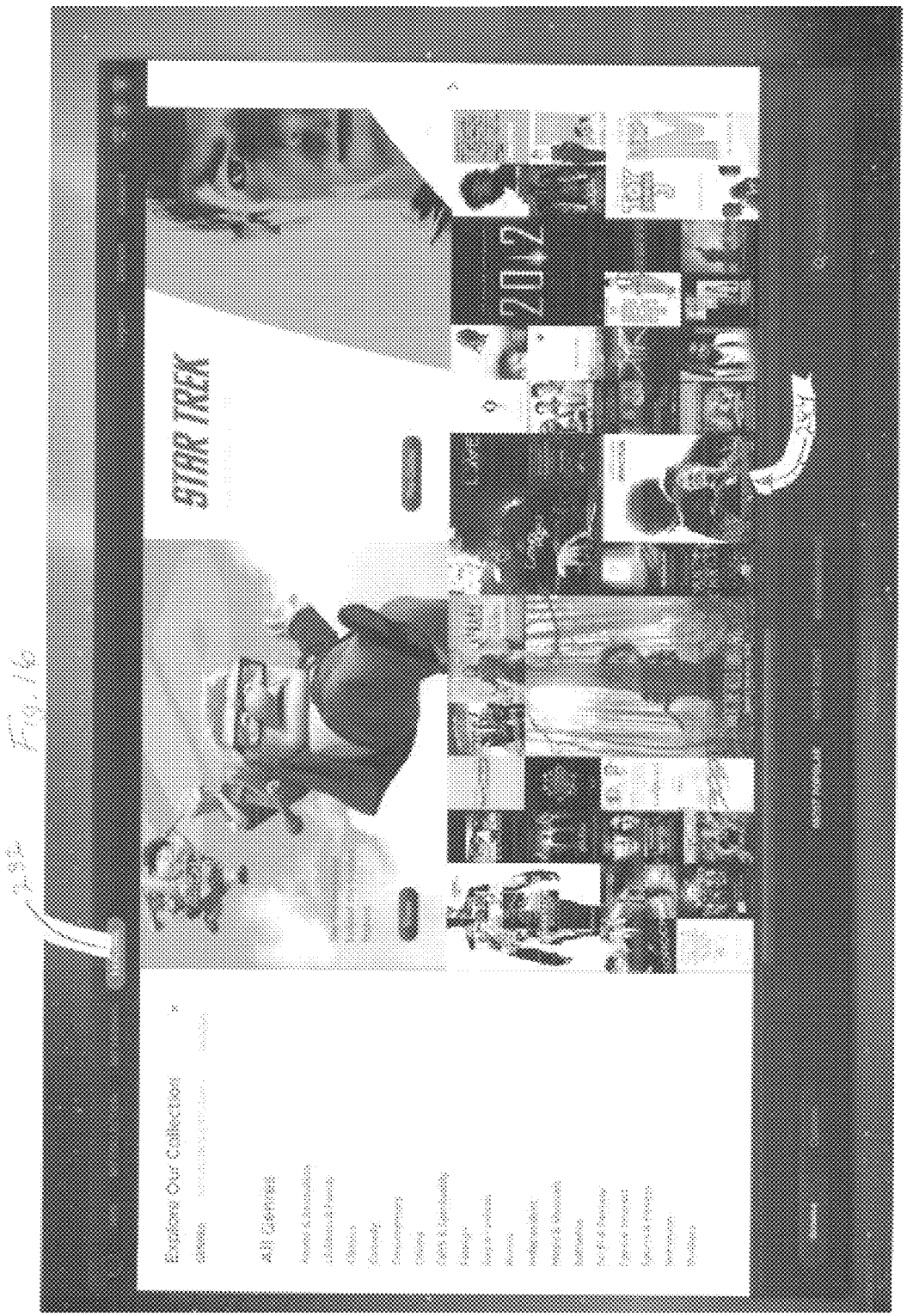

Information about system-determined content lists may be provided in response to user selection of an "explore" link, as shown in FIG. 16. As with other content lists, system content list may also be displayed in a tiled matrix 284 wherein tiles are sized in accordance with mapped parameter ranges. Parameters may include, for example, relevance score, popularity, time since release date, promotional value, price, or other factors. The media management system system may enable user selection of parameters for mapping to tile sizes; for example, the client may provide an option for the user to set tile size mapping to based on relevance score, popularity, price, or time since release.

Figure 17:
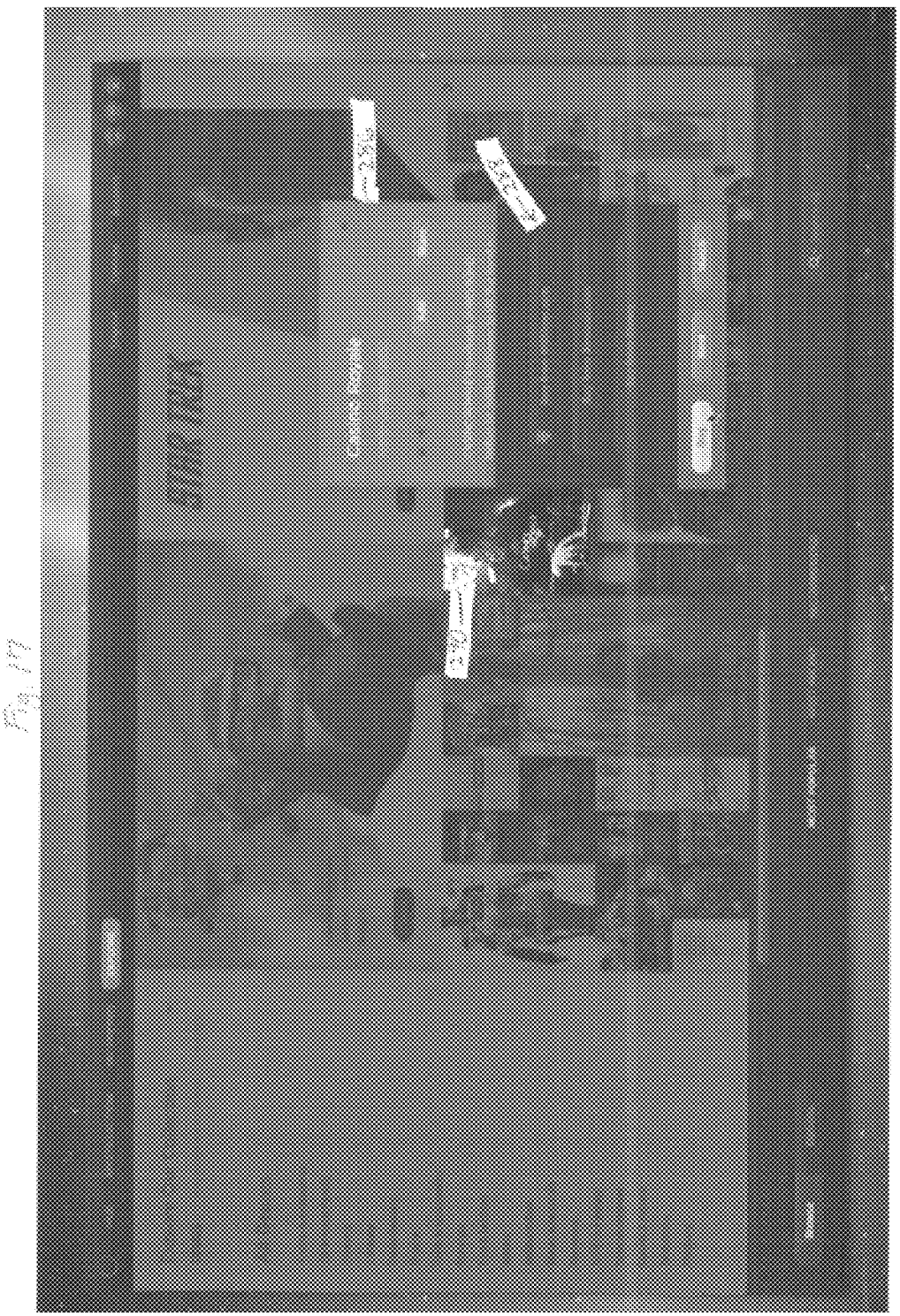
Figure 18:
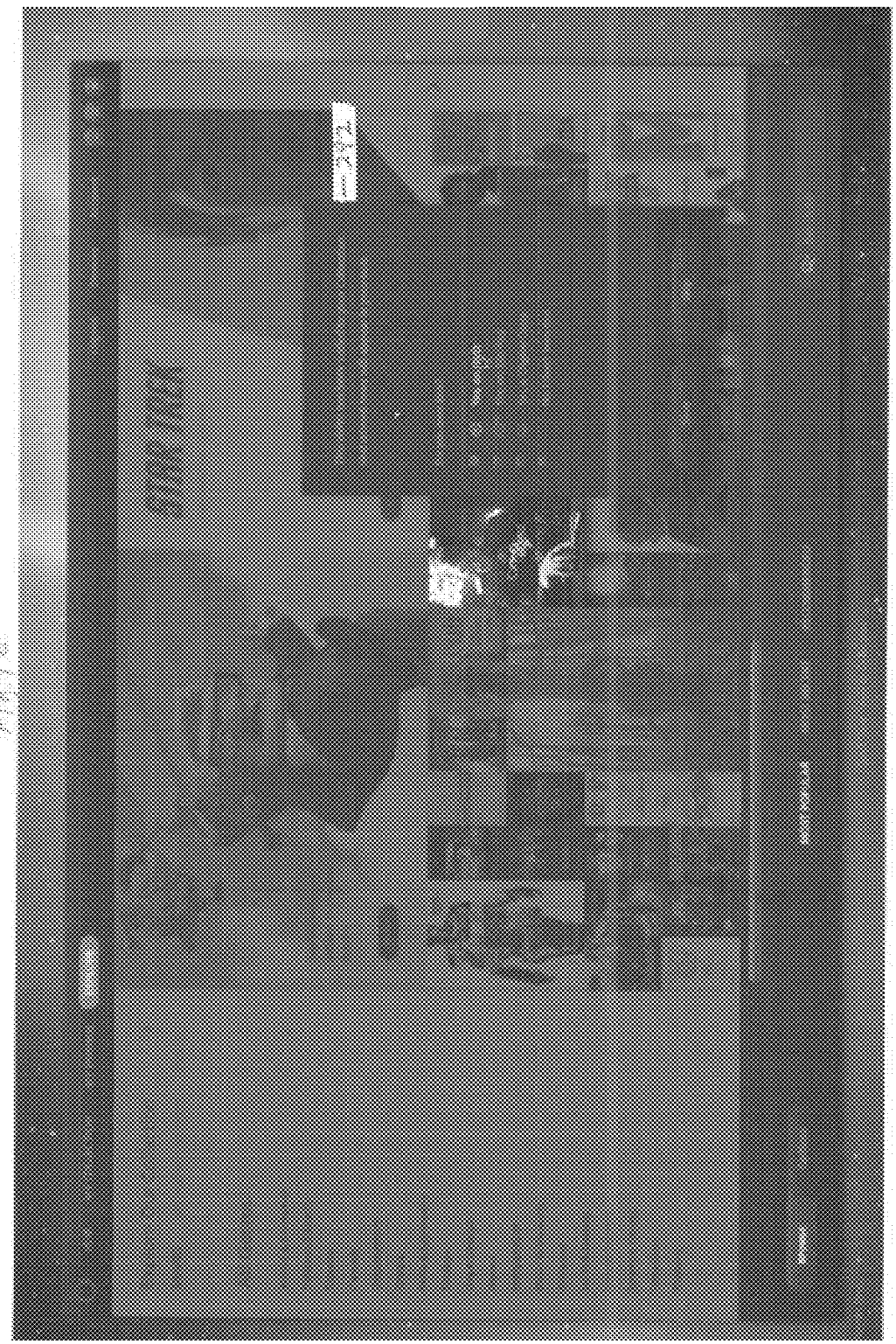

Individual tiles in matrix 284 may operate as links to a further information window 286, shown in FIG. 17. For example, tile 290 may be highlighted in response to user selection, with further information displayed in window 284 together with links 288 enabling the user to purchase, rent or watch the content title from one or more sources. As shown in FIG. 18, in response to user selection of a "edit ownership" link, the client may display an edit collection window 292. Through the edit window 292, the user can indicate which formats are owned for the content title. In response to information provided via the edit window 292, the client may update the user's collection list.

Figure 19:
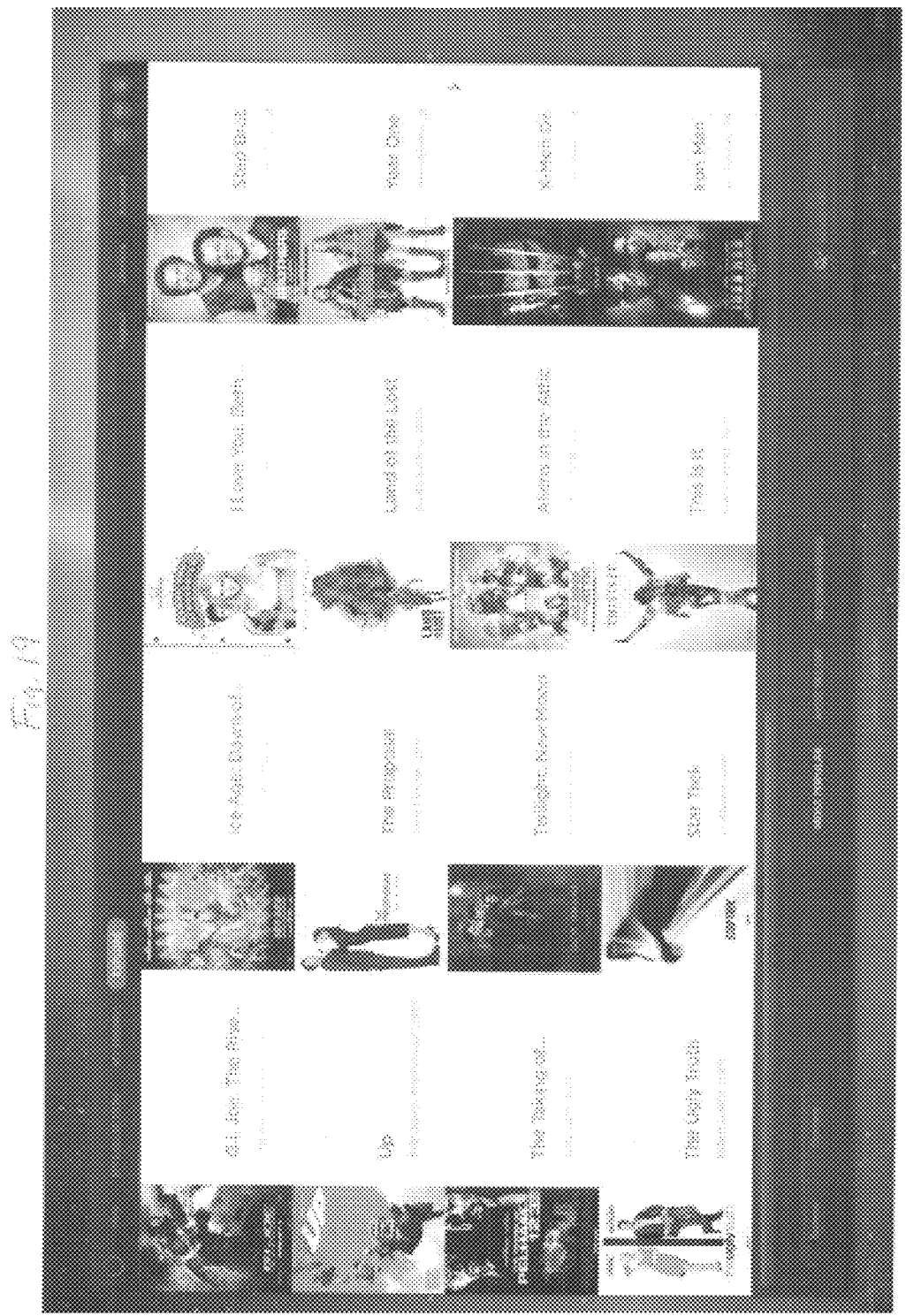
Figure 20:
Figure 21:
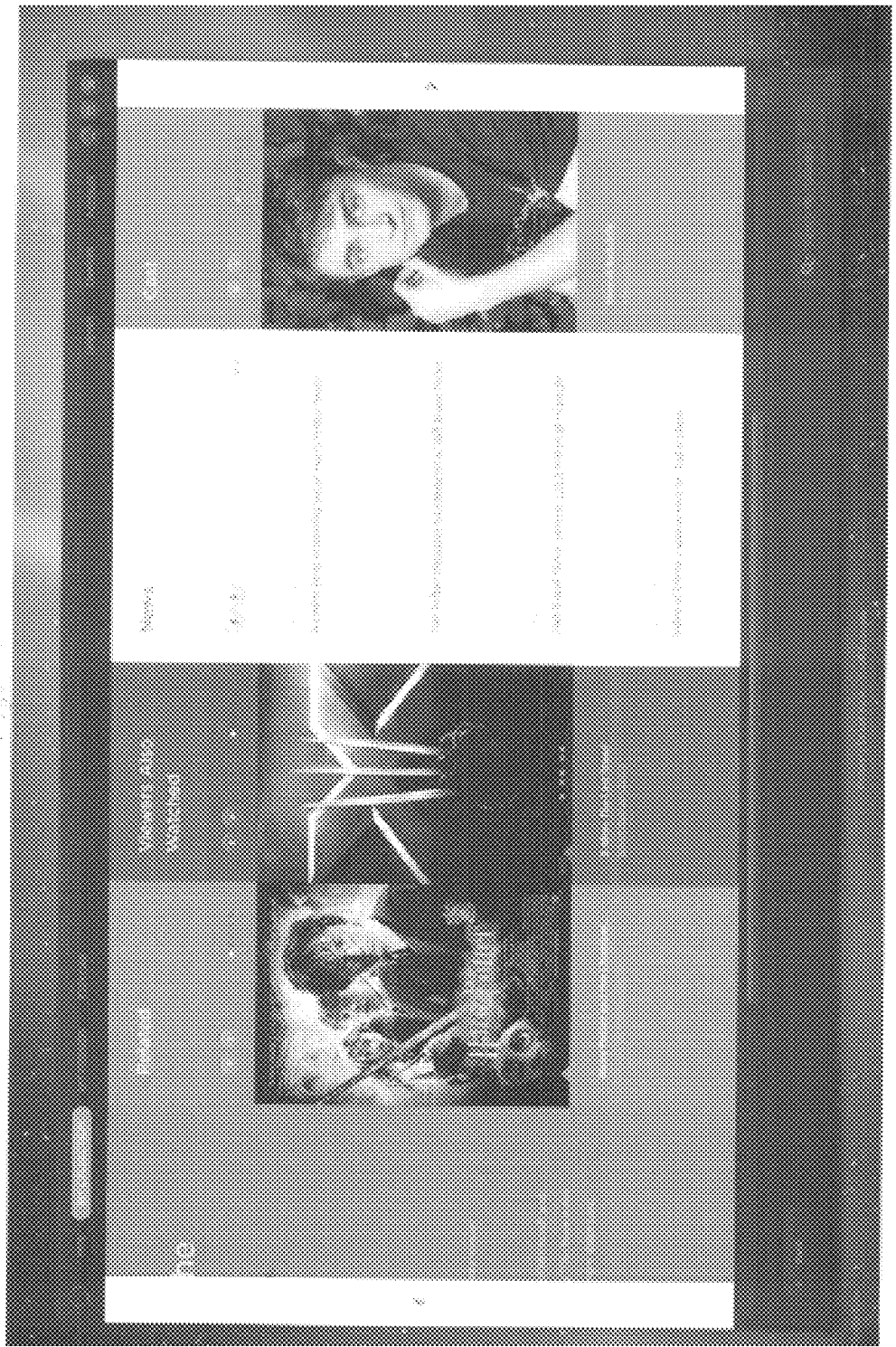
Figure 22:
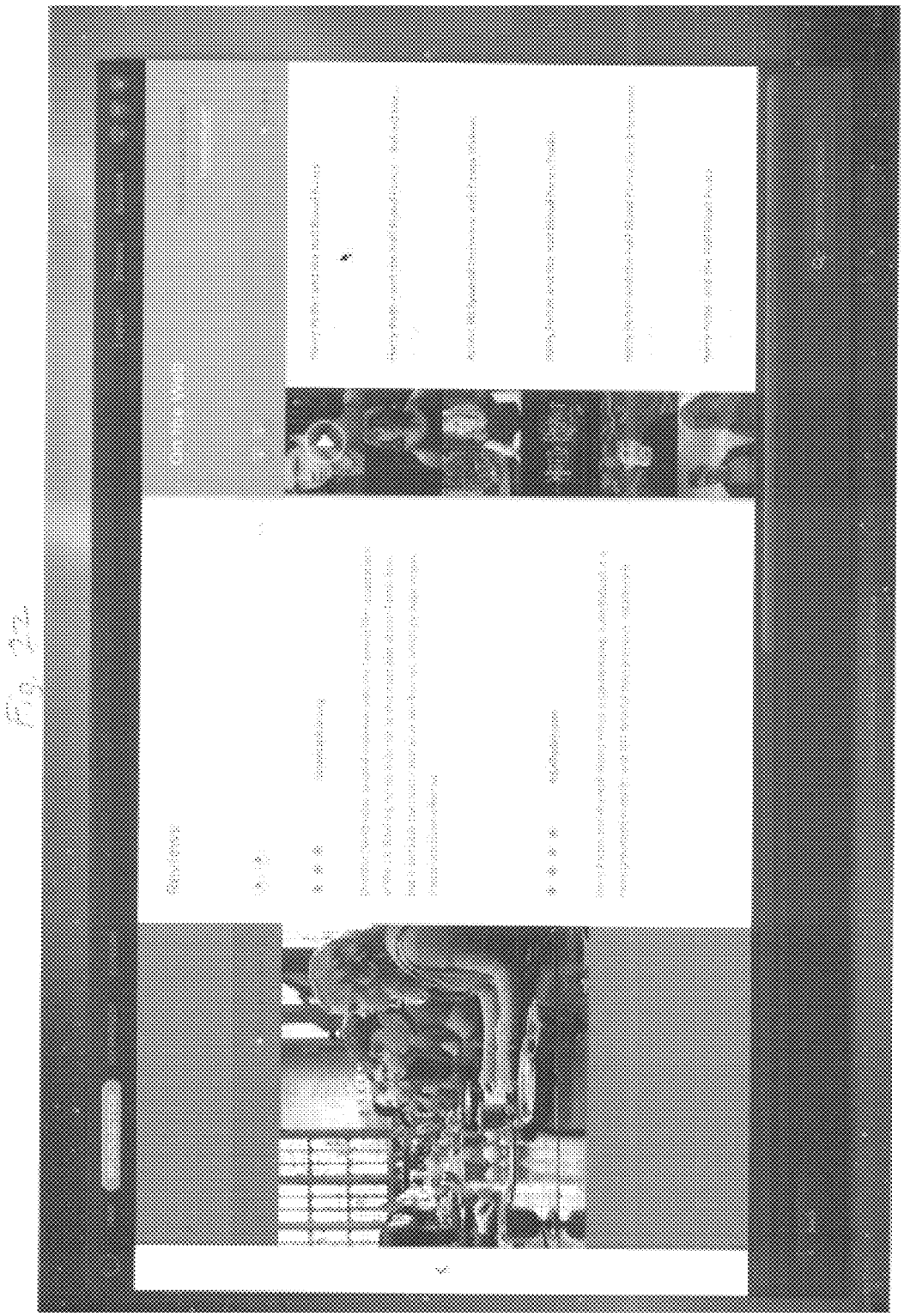
Figure 23:
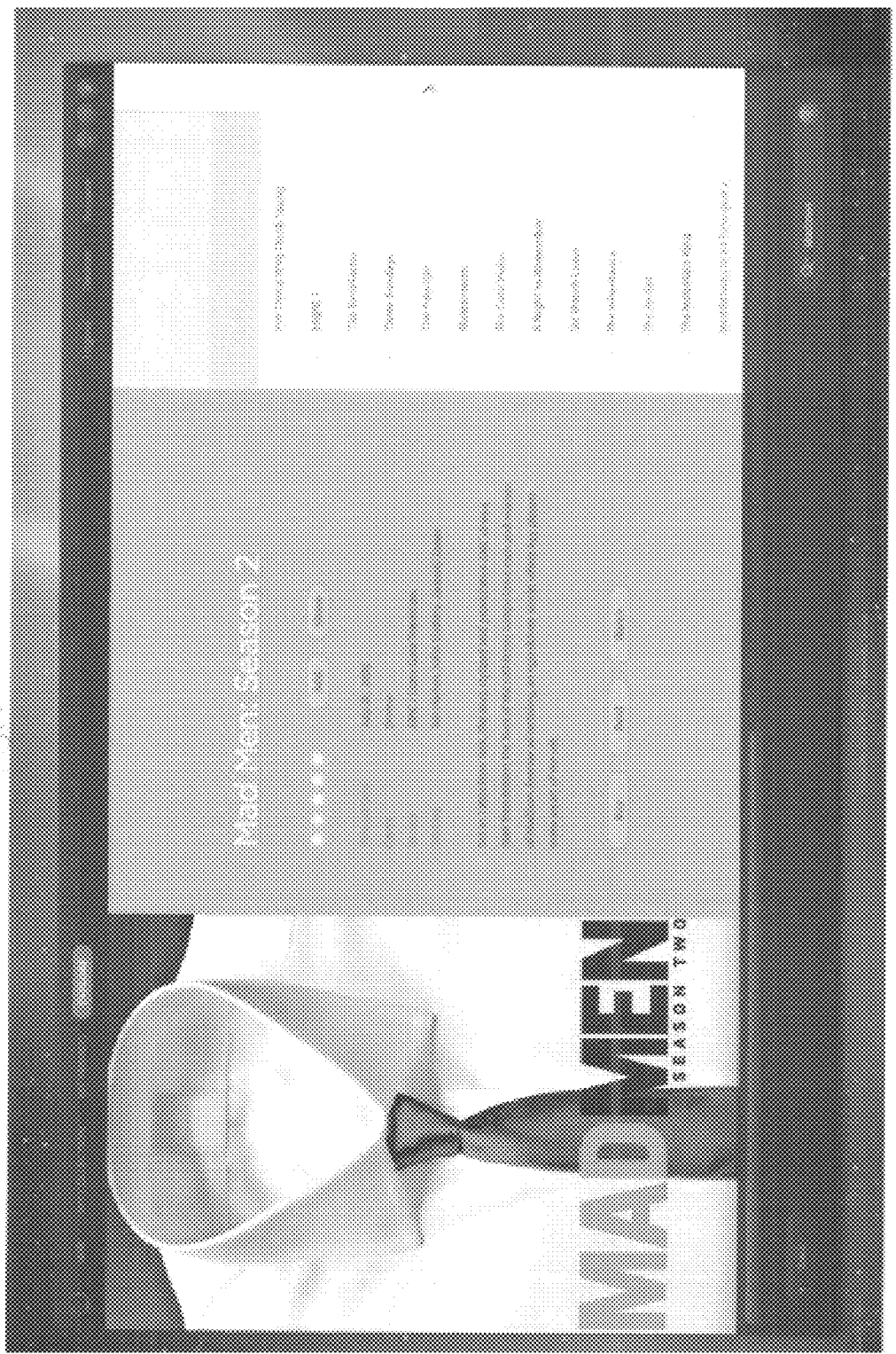
Figure 24:
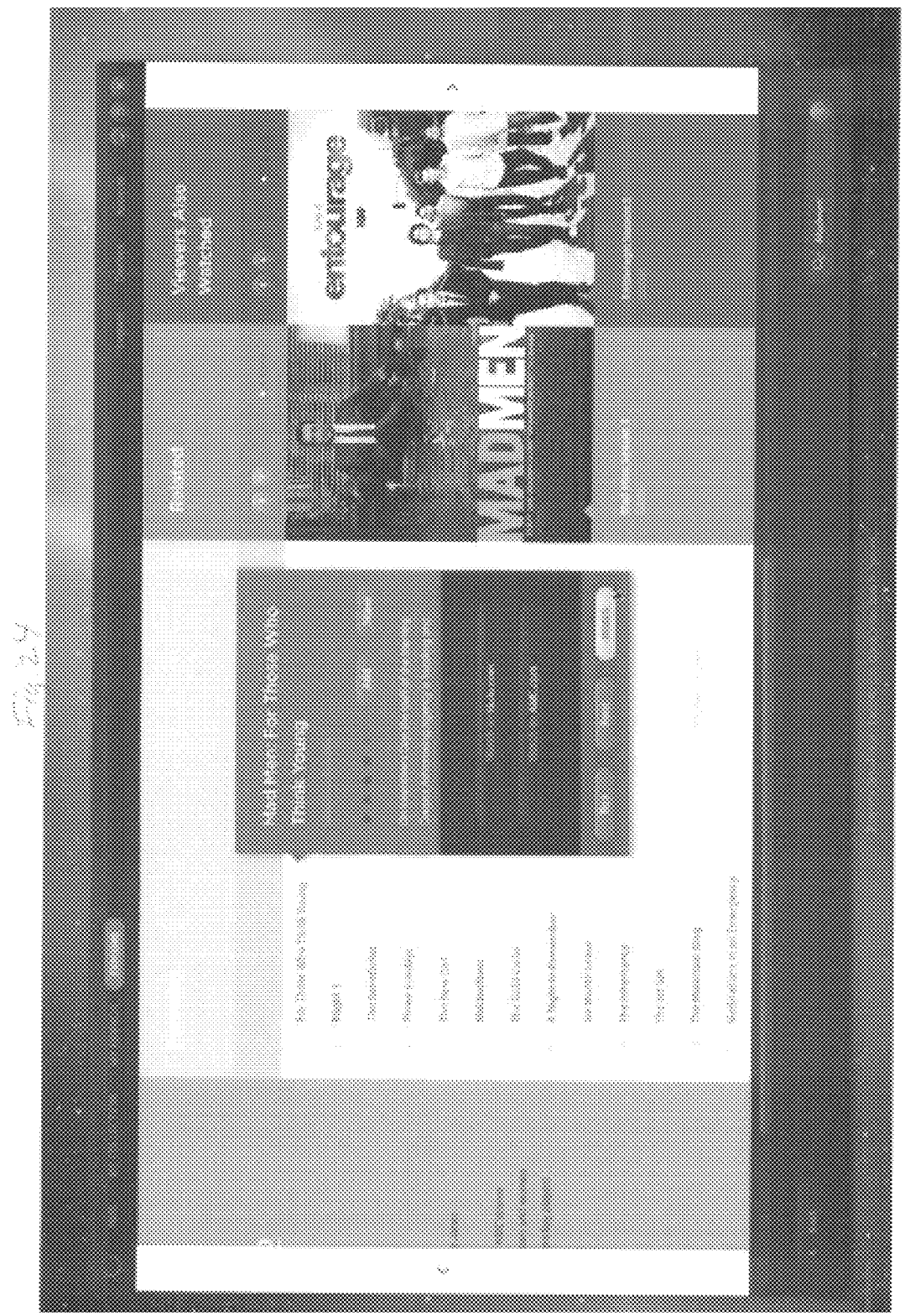

FIG. 19 shows a system collection list in a ranked order. Content titles may be ranked according to any desired parameter. FIG. 20 shows a "my collection" title detail screen including detailed information about a selected content title from the user's collection. Scrolling to the right obtains the screens as shown in FIGS. 21-22, presenting further information regarding the advertised title. FIGS. 23 and 24 show another example of an information screen for a content title.

Figure 25:
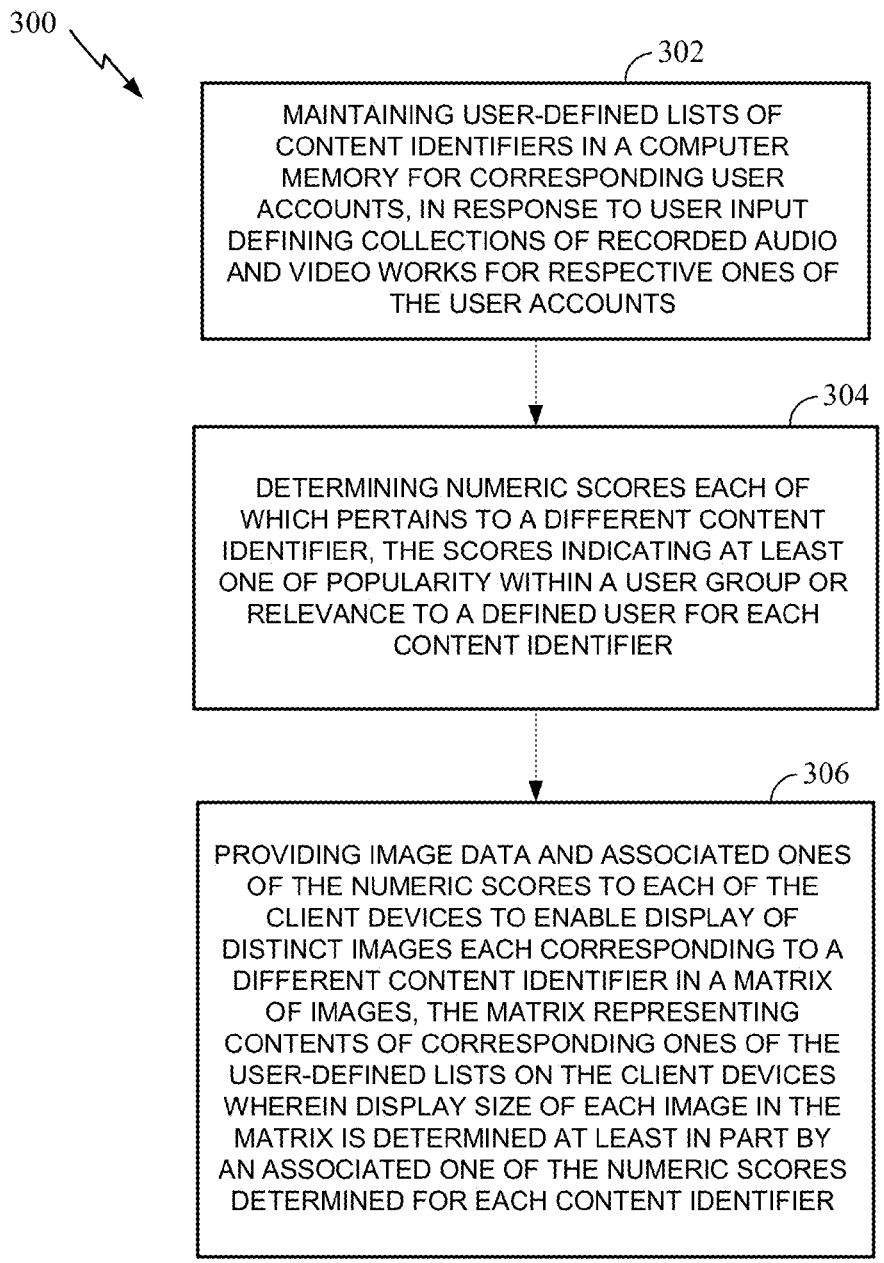
FIG. 25 is a flow chart showing an example of a media manager system method for a server component of a system.

Consistent with the foregoing examples, a computer server may perform a method 300 for servicing a media manager system, as shown in FIG. 25. The server may respond to input from multiple clients to provide information for display at each client. More particularly, in some embodiments, the server maintains user-defined lists of content identifiers in a computer memory for corresponding user accounts, in response to user input defining collections of recorded audio and video works for respective ones of the user accounts 302. For example, using an interactive object 264 as shown in FIG. 10, clients may solicit and receive user input regarding ownership of content titles. Periodically, or in response to specific events, the clients may transmit information indicated by the user input to one or more computer servers. Each server may respond by creating or updating content lists for each user, which the server maintains in a computer memory accessible to the server.

The server may also determine numeric scores each of which pertains to a different content identifier. These scores may be generated from data collected by or provided to the system, such as user preferences, user-provided content ratings, makeup of user content libraries, page views, user feedback, user queries, and so forth. The numeric scores may be designed to indicate at least one of: (i) popularity of each content title within one or more user groups; i.e., a popularity score, or (ii) predicted interest of the relevant user for each content title; i.e., a relevance score. Each content title may be identified by its content identifier for purposes of determining the numeric scores.

Popularity scores may be based on frequencies with which the ones of the content identifiers appear in the user-defined content lists 304. For example, the server may determine a popularity score for a content title as the number of content lists in which the content title appears, divided by the total number of content lists considered. To tailor a popularity score to a specific group, the server may limit analysis of content lists to lists from group members. For example, to determine popularity of a title among young adults in the range of 18-27 years old, the server may restrict its selection of content lists used in a popularity determination to content lists from young adults. In the alternative, or in addition, popularity scores may be determined based on aggregate ratings for each respective content title collected from respective users. Ratings information may be combined with population counts to obtain a popularity score, for example using a weighting algorithm. A popularity score may be normalized to a predetermined range, for example, a range of 0% to 100%, inclusive.

In contrast to popularity scores, which measure actual popularity within one or more defined groups, relevance scores provide a measure of predicted user interest in respective content titles. It should be appreciated that relevance scores may provide a basis for comparing predicted user interest in different content titles, but may be less meaningful as a measure of absolute interest. That is, relevance scores as computed by the system may be more reliable indicators of relative user interest than absolute interest; and being predictive in nature, merely represent inferences drawn from available data using an algorithm. Further details regarding computing a popularity score are provided below in connection with FIG. 27B.

The system may use popularity information, relevancy scores or other quantifiable ancillary information about content titles in a novel display technique for a content list. Accordingly, the method 300 may further comprise providing image data and associated ones of the numeric scores from the server to each of the client devices, to enable display of distinct images each corresponding to a different content identifier in a matrix of images 306. The matrix of images represents contents of corresponding ones of the user-defined lists on the client devices, wherein display size of each image in the matrix is determined at least in part by a normalized parameter, for example, an associated one of the popularity scores determined for each content identifier.

Thus, the server action 306 enables client to display an image matrix 268 as shown, for example, in FIG. 14. A more detailed description of an image matrix example is provided above in connection with FIG. 14, wherein each of the distinct images comprises a substantially rectangular two-dimensional cover image and the matrix of images comprises tiled arrangement of the cover images each sized in accordance with its corresponding popularity score or other variable. The server may perform actions consistent with that example, such as mapping popularity scores to a limited number of discrete values by the client to determine image size. In the alternative, the image matrix may be generated at the server and transmitted to the client for output on a display device.

Figure 26:
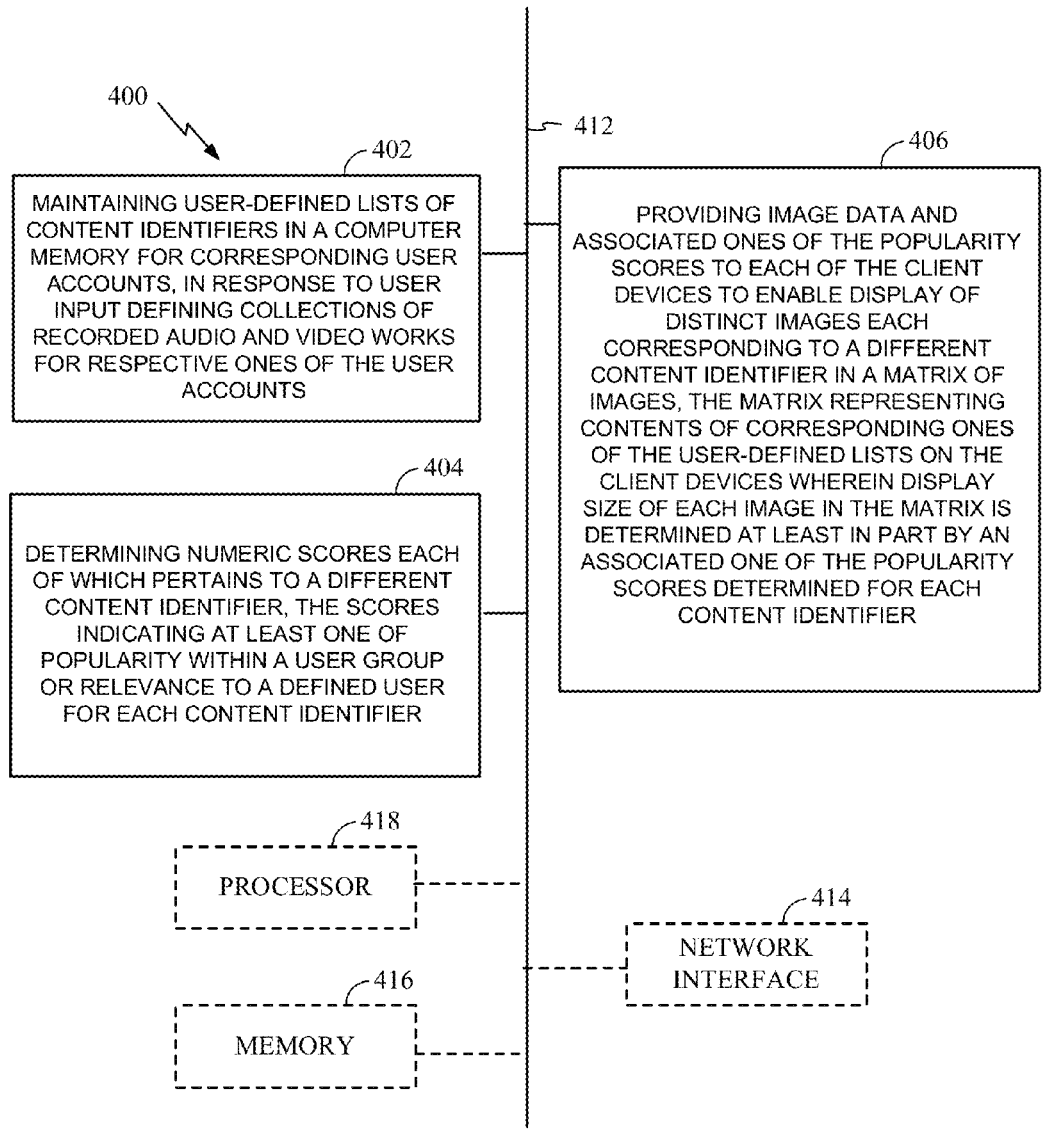
FIG. 26 is a block diagram showing an example of an apparatus for performing a media manager system method for a server component.

Consistent with method 300, and as further illustrated by FIG. 26, an apparatus 400 may function as a server for providing media manager management system services to multiple clients. The apparatus 400 may comprise an electronic component or module 402 for maintaining user-defined lists of content identifiers in a computer memory for corresponding user accounts, in response to user input defining collections of recorded audio and video works for respective ones of the user accounts. The apparatus 400 may comprise an electronic component or module 404 for determining popularity scores each of which pertains to a different content identifier, based on frequencies with which the ones of the content identifiers appear in the user-defined content lists. In the alternative, or in addition, the module 404 may determine the popularity scores based on aggregate rating information collected from users regarding each content title. The apparatus 400 may comprise an electronic component or module 406 for providing image data and associated ones of the popularity scores from the server to each of the client devices, to enable display of distinct images each corresponding to a different content identifier in a matrix of images. Qualities of the matrix of images and characteristics of data provided to the client device to enable display of the matrix thereon may be as described above in connection with method 300.

The apparatus 400 may optionally include a processor module 418 having at least one processor; in the case of the apparatus 400 this may be configured as a computer server, rather than as a general purpose microprocessor. The processor 418, in such case, may be in operative communication with the modules 402-406 via a bus 412 or similar communication coupling. The processor 418 may effect initiation and scheduling of the processes or functions performed by electrical components 402-406.

In related aspects, the apparatus 400 may include a network interface module 414 through with the processor 418 may send and receive information to clients and other servers. In further related aspects, the apparatus 400 may optionally include a module for storing information, such as, for example, a memory device/module 416. The computer readable medium or the memory module 416 may be operatively coupled to the other components of the apparatus 400 via the bus 412 or the like. The memory module 416 may be adapted to store computer readable instructions and data for effecting the processes and behavior of the modules 402-406, and subcomponents thereof, or the processor 418, or the methods disclosed herein, and other operations for media system management and other use. The memory module 416 may retain instructions for executing functions associated with the modules 402-406. While shown as being external to the memory 416, it is to be understood that the modules 402-406 may exist at least partly within the memory 416, optionally with additional modules for performing other functions as described herein or otherwise.

Figure 27A:
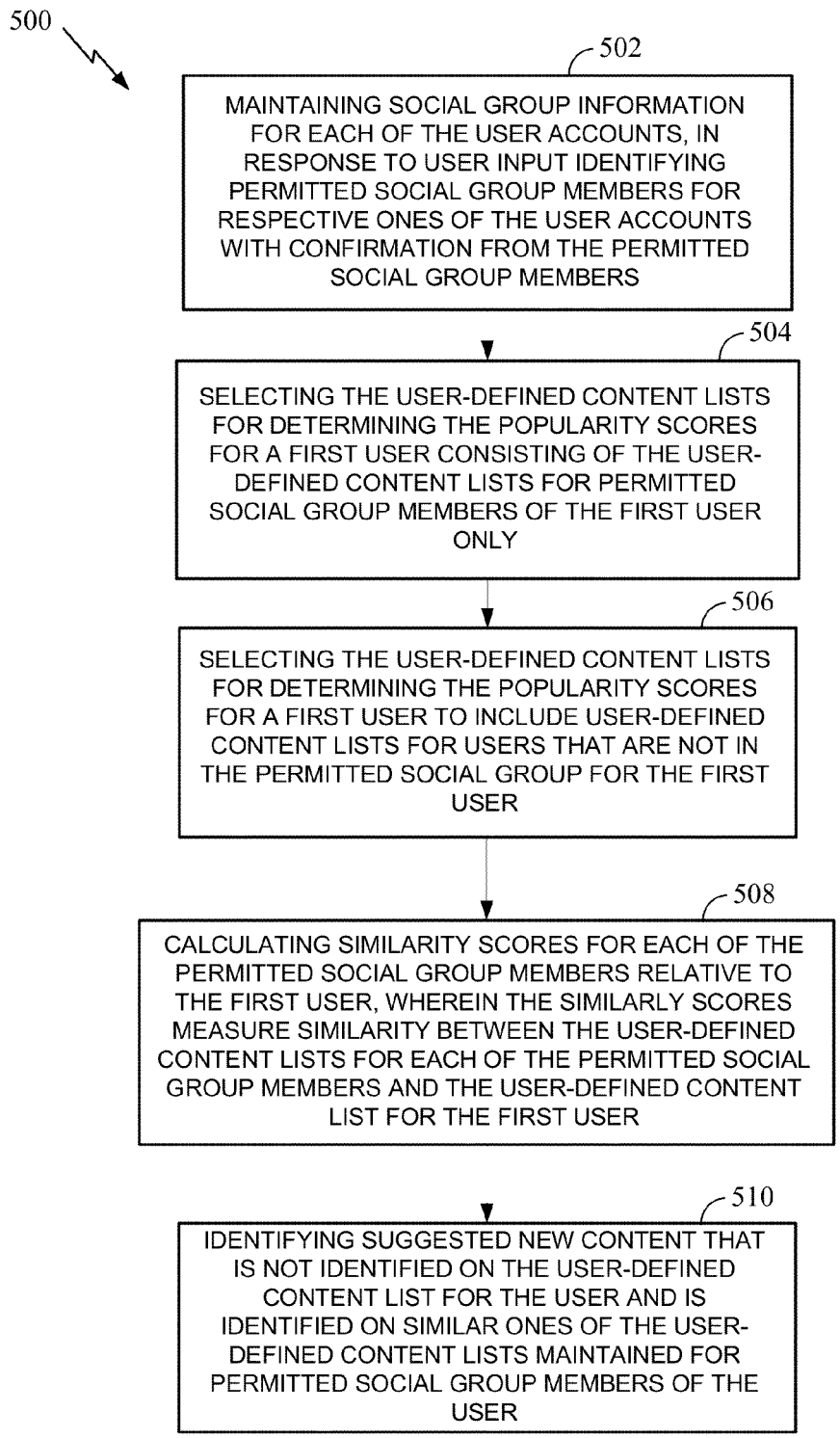
FIG. 27A is a flow chart showing additional operations for use with the method of FIG. 25, regarding popularity scores.

FIG. 27A shows additional operations 500 that may be performed by a server, in conjunction with the method 300. The apparatus 400 may similarly be configured with additional modules for performing any or all of operations 500, together with the modules 402-406. 2. The apparatus may perform maintaining social group information for each of the user accounts 502, in response to user input identifying permitted social group members for respective ones of the user accounts with confirmation from the permitted social group members. For example, the user may identify friends via a user interface, and the server may transmit messages to other client devices for the identified friends, who may thereby confirm, deny, or ignore a relationship with the user. In response to receiving a confirmation message, the server may add an identifier for the confirming friend to a friends list for the user. Similarly, the server may delete friends in response to input from the user or from friends to maintain a current social group list for the user. The permitted social group members may be the other users of the system identified in the system's current friends list for the user.

The method 300 may also include selecting the user-defined content lists for determining the popularity scores for a first user 504 consisting of the user-defined content lists for permitted social group members of the first user only. This operation enables the user to see the popularity of specific content titles within his self-identified social group. As noted above, popularity of a particular title may be determined by counting the number of library lists that include the title, divided by the total number of library lists in the relevant sample. User ratings, for example, 1 to 5 stars or A to F, may also be used, in the alternative, or in combination with library population data. In the alternative, method 300 may further comprise selecting the user-defined content lists for determining the popularity scores for a first user 506 to include user-defined content lists for users that are not in the permitted social group for the first user. For example, library lists and/or ratings may be collected from a particular demographic segment of users, or from all users of the system. Method 300 may further comprise providing information about user-defined content lists maintained for permitted social group members of a first user from a server to a client device for the first user. The server may provide the information about user-defined content lists comprising copies of the user-defined content lists. In the alternative, the information may be provided in some other format, as metadata concerning the user-defined content lists.

The method 300 may further comprise calculating similarity scores for each of the permitted social group members relative to the first user 508, wherein the similarly scores measure similarity between the user-defined content lists for each of the permitted social group members and the user-defined content list for the first user. In addition, or in the alternative, similarity between users may be determined based on similarity of user demographic profiles and preferences. Similarity may be calculated using the server operating any suitable comparison algorithm, examples of which are described herein above. A server may calculate and serve the similarity scores to a client device for display to the first user.

The method 300 may further comprise identifying suggested new content 510 that is not identified on the user-defined content list for the user and is identified on similar ones of the user-defined content lists maintained for permitted social group members of the user. Such content may be of interest to the user. The server may transmit identifiers for the content identified in the operation 510 to the client device for presentation to the user via the user interface. Thus, the system may use a similarity score to facilitate new content discovery among users. For example, if a high similarity (e.g., >80% or >90%) is determined to exist between users 'A' and 'B', it may be inferred that any title in User A's library and not in User B's will be of interest to User B, and vice-versa. Thus, the server may identify such non-overlapping titles and cause the respective clients to suggest them as potential new titles to the respective users.

Figure 27B:
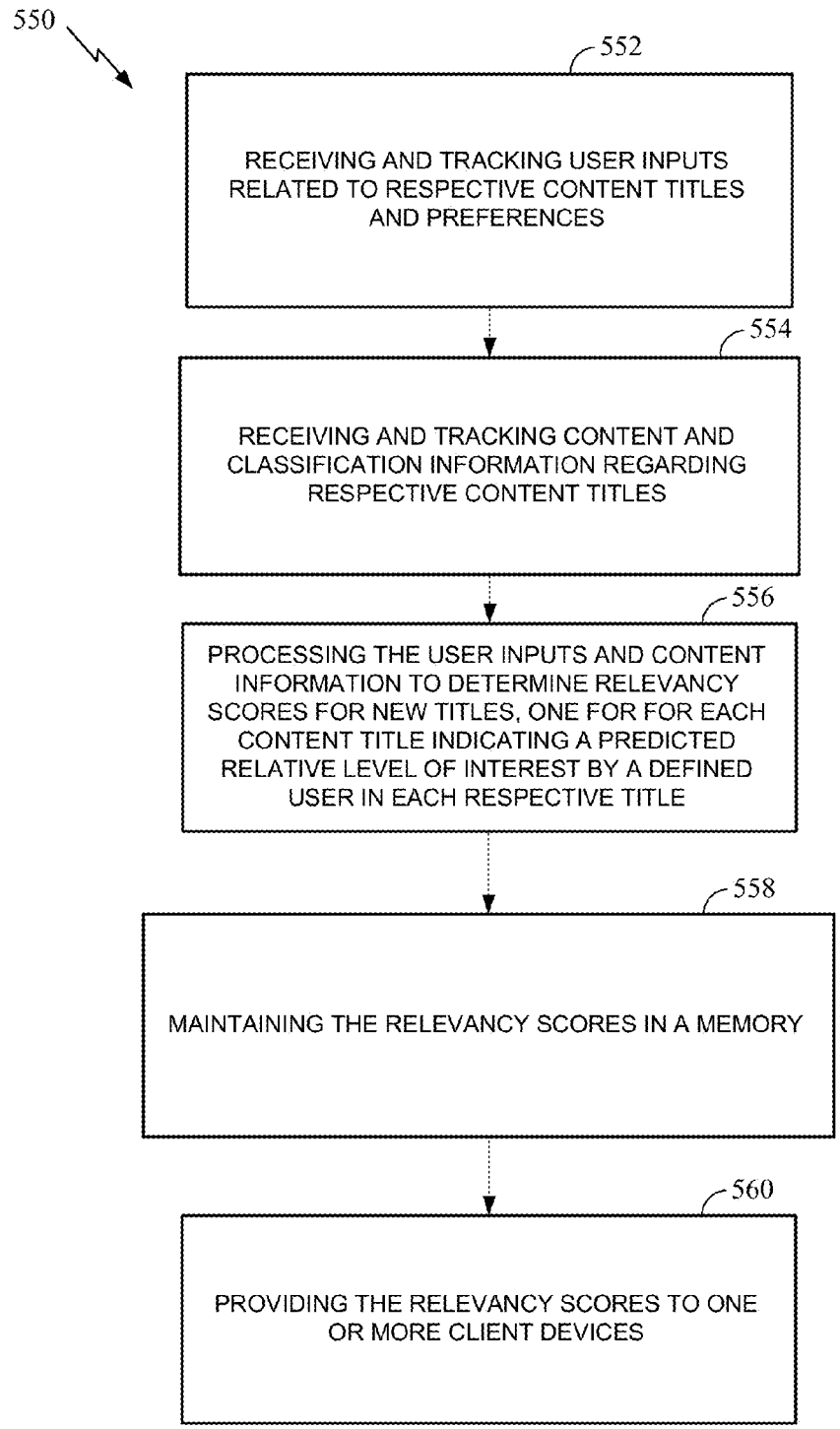
FIG. 27B is a flow chart showing additional operations for use with the method of FIG. 25, regarding relevance scores.

FIG. 27B shows additional operations 550 that may be performed by a server, in conjunction with the method 300 to provide relevancy scores for content titles. The apparatus 400 may similarly be configured with additional modules for performing any or all of operations 550, together with the modules 402-406. The server and/or client devices may receive and track 552 user inputs related to respective content titles and general preferences. The user input may include any data originating in or from user activity from which a degree of relative user interest in a particular content title, or user preference for an attribute or feature of a content title, may be inferred. Such data may include, for example, any user interaction with a particular title, such as reviewing and viewing data; keywords used in search queries from users; user answers to questionnaires, user ratings of content titles, user demographic profile, similarities with other users, and user content library information. Characteristically, the data is associated with identified users of the system. Some portion, or all, of the user data may be collected using client-side applications and transmitted to one or more servers for further processing. Tracking may include maintaining current and past user data in a database associated with corresponding user identifiers.

In addition, the method 554 may include receiving and tracking content and classification information regarding respective content title. Content and classification information may include, for example: title, length, date, genre, plot synopsis, actors, producer, director, writer, animator, or other creative contributor, awards, MPAA rating, user ratings, musical score, awards, user ratings, scenes, filmography, or popularity within defined user groups. Characteristically, this data is associated with particular film titles. It may be collected and developed from user data, may be supplied administratively through a data service or the like, or some combination of the foregoing sources. Tracking content and classification data for content titles may include, for example, maintaining current and past data in a database associated with corresponding content identifiers.

The server may periodically, or in response to one or more events, process 556 the user inputs and content information to determine relevancy scores for new titles. The server may determine a relevancy score for each content title and identified user. The score indicates a predicted relative level of interest by each defined user in each respective title. The server may use any suitable computation method to compute a relevancy score; for example, the server may compute a weighted average of multiple factors each of which quantifies user actual or potential user interest in one or more characteristics or features of the content title. Because the amount of available data used to compute relevancy scores may vary between titles for a particular user, the system may normalize relevancy score results to compensate for differences in available data and enhance their suitability as a netric of comparison.

After scores are computed, the server may maintain relevancy scores 558 in a system memory. Scores may be maintained at the server level, at the client, or both. The server may provide relevancy scores 560 to clients for the corresponding users to enable display operations as disclosed herein, and for other uses.

Figure 28:
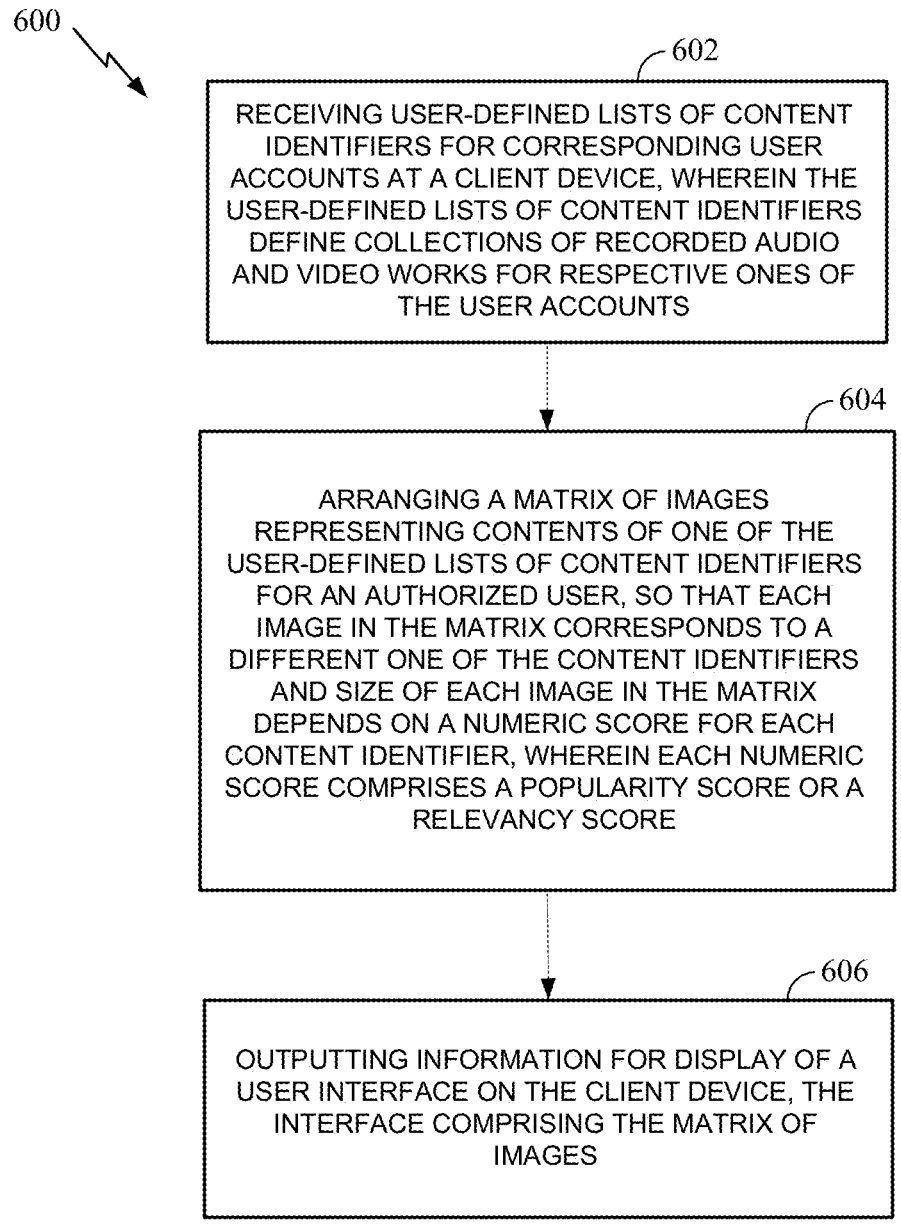
FIG. 28 is a flow chart showing an example of a media manager system method for a client component of a system.

FIG. 28 shows a client-side method 600, including operations complementary to those in the server-side method 300, for performance by a client device in communication with a server to obtain results such as, for example, depicted in FIGS. 2-24 at a client user interface. The method 600 may comprise receiving user-defined lists of content identifiers for corresponding user accounts at a client device 602, wherein the user-defined lists of content identifiers define collections of recorded audio and video works for respective ones of the user accounts. The client may receive the lists from a server that collects and maintains the lists in response to input from different users provided through multiple client devices, namely input defining user ownership of content titles. The client may use the lists to display different image matrixes representing different content lists. For example, the client may display a matrix for a list of a first user logged into the system via the client, and matrixes for lists of various members of a social group identified by the first user.

The method 600 may further comprise arranging a matrix of images representing contents of one of the user-defined lists of content identifiers for an authorized user 604, so that each image in the matrix corresponds to a different one of the content identifiers and size of each image in the matrix depends on a numeric score for each content identifier. Each image in the matrix may be arranged to comprise a substantially rectangular two-dimensional image such that the matrix of images comprises a tiled arrangement of the rectangular images each sized in accordance with its corresponding numeric score. The numeric score may be or may comprise a popularity score as described herein. In the alternative, or in addition, the numeric score may be or comprise a relevancy score as described herein.

Each popularity score may be a measure of relative frequency with which a corresponding one of the content identifiers appears in the user-defined content lists, and/or may be weighted by or consist of aggregate rating information from system users. The popularity scores may be determined by the server and transmitted to the client, calculated by the client using available content list or other information, or both. The resulting matrix may appear as depicted in FIG. 14 and include features as more particularly described in connection with that figure. Arranging the matrix may include generating display output using an algorithm operating on the content list and popularity data and cover image data, generating a video signal to display an image matrix generated at the client or provided to the client by a server, or both. Method 600 may further comprise outputting information for display of a user interface on the client device 606, the interface comprising the matrix of images.

Figure 29:
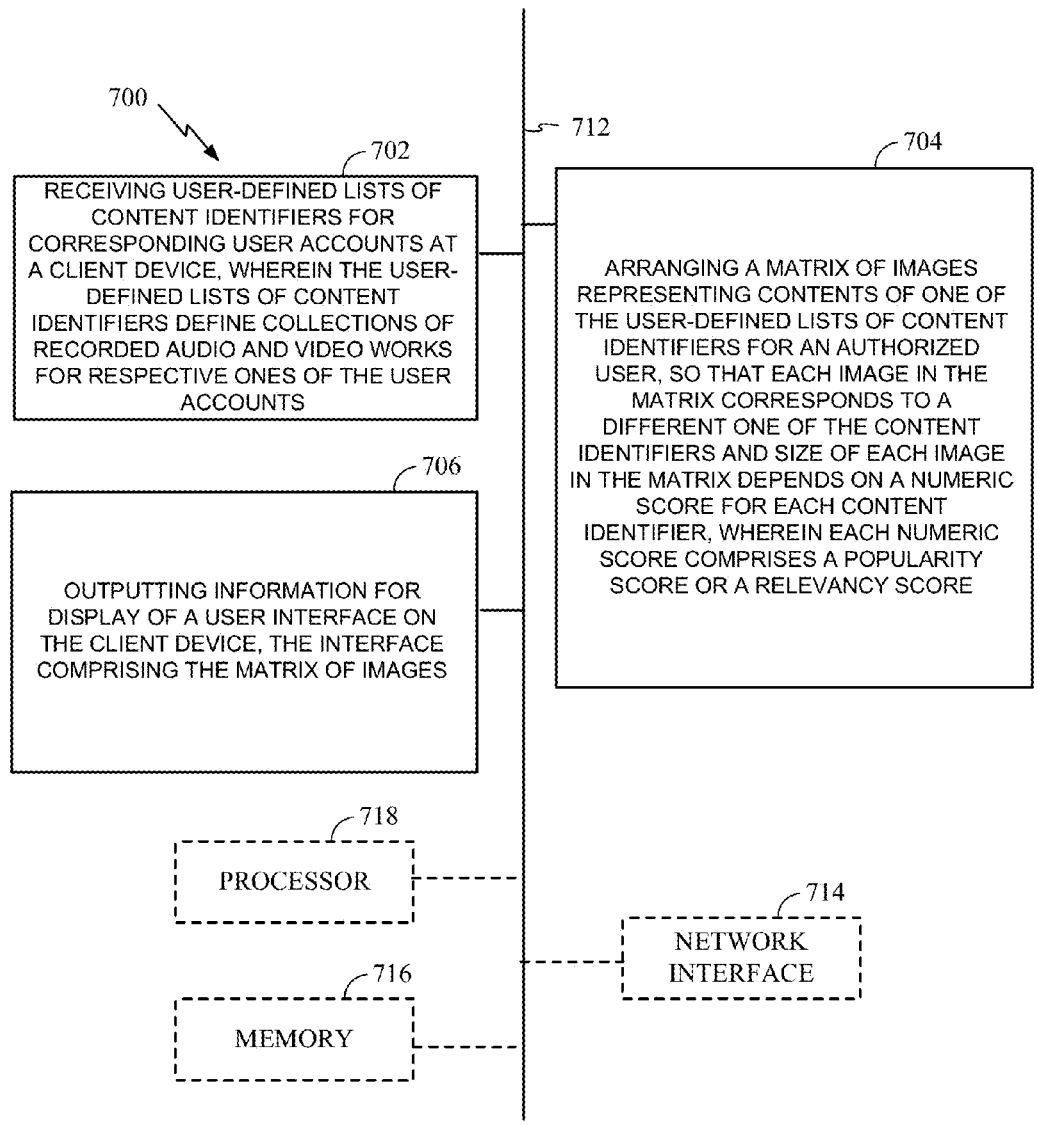
FIG. 29 is a block diagram showing an example of an apparatus for performing a media manager system method for a client component.

Consistent with method 600, and as further illustrated by FIG. 29, an apparatus 700 may function as a server for providing media manager system services to multiple clients. The apparatus 700 may comprise an electronic component or module 702 for receiving user-defined lists of content identifiers for corresponding user accounts at a client device, wherein the user-defined lists of content identifiers define collections of recorded audio and video works for respective ones of the user accounts. The apparatus 700 may comprise an electronic component or module 704 for arranging a matrix of images representing contents of one of the user-defined lists of content identifiers for an authorized user 604, so that each image in the matrix corresponds to a different one of the content identifiers and size of each image in the matrix depends on a numeric score for each content identifier. The module may determine or use the numeric scores as described herein above; for example, the numeric score may comprise a popularity score or a relevancy score. The apparatus 700 may comprise an electronic component or module 706 for outputting information for display of a user interface on the client device, the interface comprising the matrix of images. Qualities of the matrix of images and more detailed operations of the client device to cause display of the image matrix thereon may be as described above in connection with method 600.

The apparatus 700 may optionally include a processor module 718 having at least one processor; in the case of the apparatus 700 this may be configured as a client device for a computer server, rather than as a general purpose microprocessor. The processor 718, in such case, may be in operative communication with the modules 702-706 via a bus 712 or similar communication coupling. The processor 718 may effect initiation and scheduling of the processes or functions performed by electrical components 702-706.

In related aspects, the apparatus 700 may include a network interface module 714 through with the processor 718 may send and receive information to clients and other servers. In further related aspects, the apparatus 700 may optionally include a module for storing information, such as, for example, a memory device/module 716. The computer readable medium or the memory module 716 may be operatively coupled to the other components of the apparatus 700 via the bus 712 or the like. The memory module 716 may be adapted to store computer readable instructions and data for effecting the processes and behavior of the modules 702-706, and subcomponents thereof, or the processor 718, or the methods disclosed herein, and other operations for media management system, and other use. The memory module 716 may retain instructions for executing functions associated with the modules 702-706. While shown as being external to the memory 716, it is to be understood that the modules 702-706 may exist at least partly within the memory 716, optionally with additional modules for performing other functions as described herein or otherwise.

Figure 30:
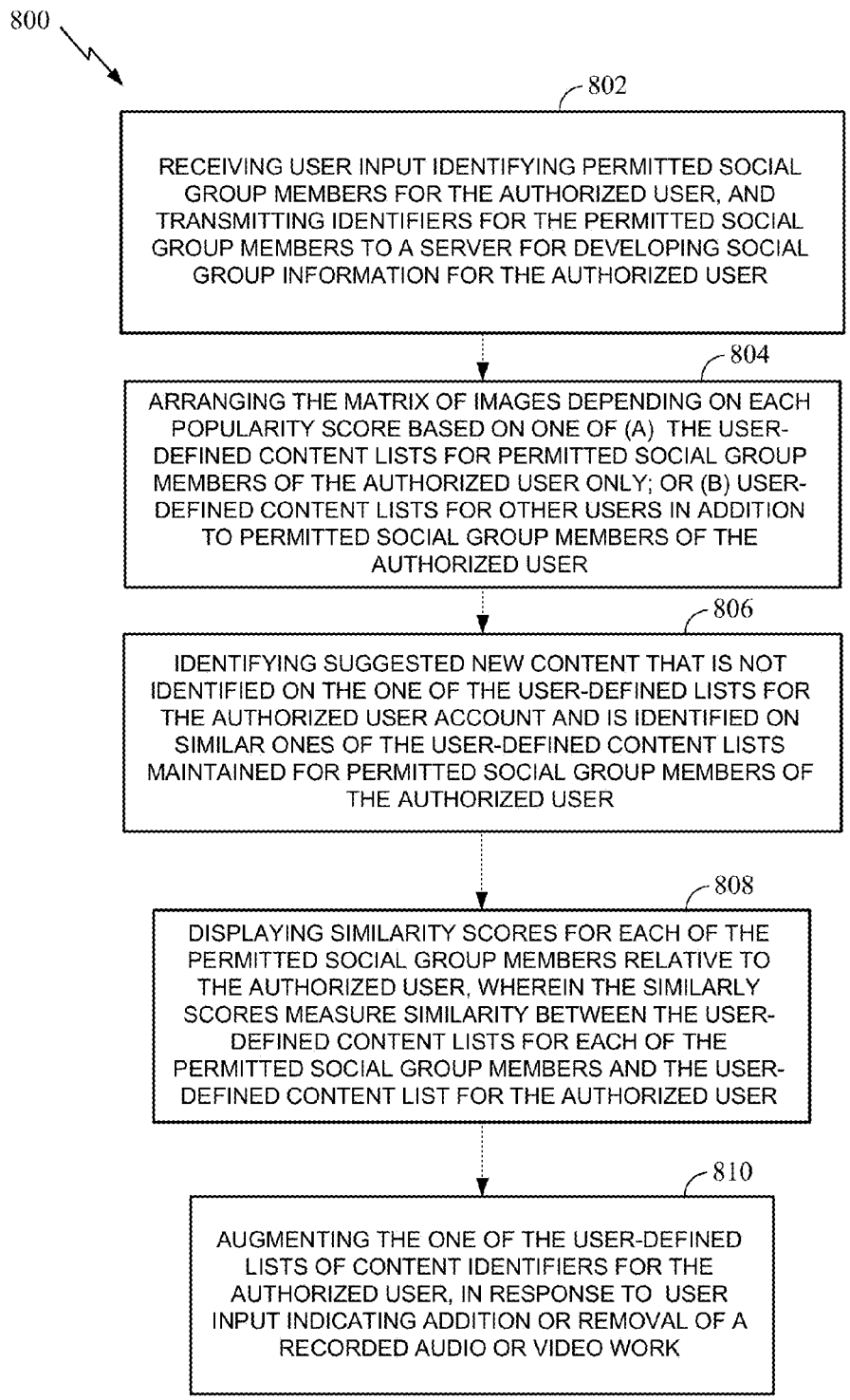
FIG. 30 is a flow chart showing additional operations for use with the method of claim 28.

FIG. 30 shows additional operations 800 that may be performed by a server, in conjunction with method 600. The apparatus 700 may similarly be configured with additional modules for performing any or all of operations 800, together with the modules 702-706. The method 600 may further comprise comprising receiving user input identifying permitted social group members for the authorized user, and transmitting identifiers for the permitted social group members to a server for developing social group information for the authorized user 802. The server may act on the received information to confirm and update the makeup of the providing user's group membership.

The method 600 may further comprise arranging the matrix of images depending on each popularity score 804. The numeric score may comprise a popularity score indicating a relative frequency with which a corresponding one of the content identifiers appears in the user-defined content lists for permitted social group members of the authorized user only. In the alternative, or in addition, the popularity score may be a measure of relative frequency with which a corresponding one of the content identifiers appears in the user-defined content lists for other users in addition to permitted social group members of the authorized user. Other alternatives include incorporating rating information into a popularity score, as described above. In the alternative, or in addition, the numeric score may comprise a relevancy score indicating a predicted likelihood that the associated content title will be of interest to an identified user.

The method 600 may further comprise identifying suggested new content that is not identified on the one of the user-defined lists for the authorized user account and is identified on similar ones of the user-defined content lists maintained for permitted social group members of the authorized user 806. For example, the client may identify these titles and display a message informing the user of popular titles owned by other group members. Similarly, the method may comprise providing an option in the user interface for the authorized user to view the user-defined content lists for the permitted social group members.

The method 600 may further comprise displaying similarity scores for each of the permitted social group members relative to the authorized user 808, wherein the similarly scores measure similarity between the user-defined content lists for each of the permitted social group members and the user-defined content list for the authorized user. Similarity may be measured at the client or the server, using an algorithm as described herein above.

The method 600 may further comprise augmenting the one of the user-defined lists of content identifiers for the authorized user 810, in response to user input indicating addition or removal of a recorded audio or video work. For example, the client may cause the user interface to display an interactive object soliciting user input indicating the removal or addition, and update the user's content list in response to the input. The method 600 may further comprise responding to user selection of an image in the matrix of images to display further information about a recorded audio or video work indicated by the selection of the image.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or medium.

The invention claimed is:

1. A computer-implemented method, comprising:
maintaining user-defined lists of content identifiers in a computer memory for corresponding user accounts, in response to user input defining collections of recorded audio and video works for respective ones of the user accounts;
maintaining social group information for each of the user accounts, in response to user input identifying permitted social group members for respective ones of the user accounts;
providing, from a server to a client device for a first user, information about user-defined content lists maintained for permitted social group members of the first user;
determining popularity scores each of which pertains to a different content identifier based on frequencies with which the ones of the content identifiers appear in the user-defined content lists;
selecting the user-defined content lists for determining the popularity scores for the first user from at least one of: (a) lists consisting of the user-defined content lists for permitted social group members of the first user, or (b) lists including user-defined content lists for users that are not in the permitted social group for the first user; and
providing image data and associated ones of the popularity scores to the client device to enable display of distinct images each corresponding to a different content identifier in a matrix of images, the matrix representing contents of corresponding ones of the user-defined lists on the client device wherein display size of each image in the matrix is determined at least in part by an associated one of the popularity scores determined for each content identifier.

2. The method of claim 1, wherein the server provides the information about user-defined content lists comprising copies of the user-defined content lists.

3. The method of claim 1, further comprising calculating similarity scores for each of the permitted social group members relative to the first user, wherein the similarly scores measure similarity between the user-defined content lists for each of the permitted social group members and the user-defined content list for the first user.

4. The method of claim 1, further comprising identifying suggested new content that is not identified on the user-defined content list for the user and is identified on similar ones of the user-defined content lists maintained for permitted social group members of the user.

5. The method of claim 1, wherein each of the distinct images comprises a substantially rectangular two-dimensional cover image and the matrix of images comprises tiled arrangement of the cover images each sized in accordance with its corresponding popularity score.

6. An apparatus comprising a processor coupled to a memory, the memory holding instructions for:
maintaining user-defined lists of content identifiers in a computer memory for corresponding user accounts, in response to user input defining collections of recorded audio and video works for respective ones of the user accounts;
maintaining social group information for each of the user accounts, in response to user input identifying permitted social group members for respective ones of the user accounts;
providing, to a client device for a first user, information about user-defined content lists maintained for permitted social group members of the first user;
determining poularity scores each of which pertains to a different content identifier based on frequencies with which the ones of the content identifiers appear in the user-defined content lists or;
selecting the user-defined content lists for determining the popularity scores for the first user from at least one of: (a) lists consisting of the user-defined content lists for permitted social group members of the first user, or (b)

lists including user-defined content lists for users that are not in the permitted social group for the first user;

providing the popularity scores to client devices; and providing image data to each of the client devices to enable display of distinct images each corresponding to a different content identifier in a matrix of images, the matrix representing contents of corresponding ones of the user-defined lists on the client devices wherein display size of each image in the matrix is determined at least in part by respective ones of the popularity scores determined for each content identifier.

7. The apparatus of claim 6, wherein the memory further holds instructions for providing the information about user-defined content lists comprising copies of the user-defined content lists.

8. The apparatus of claim 6, wherein the memory further holds instructions for calculating similarity scores for each of the permitted social group members relative to the first user, wherein the similarly scores measure similarity between the user-defined content lists for each of the permitted social group members and the user-defined content list for the first user.

9. The apparatus of claim 6, wherein the memory further holds instructions for identifying suggested new content that is not identified on the user-defined content list for the user and is identified on similar ones of the user-defined content lists maintained for permitted social group members of the user.

10. The apparatus of claim 6, wherein the memory further holds instructions for preparing each of the distinct images to comprise a substantially rectangular two-dimensional cover image and the matrix of images to comprise a tiled arrangement of the cover images each sized in accordance with its corresponding numeric score.

11. A method, comprising:

receiving user-defined lists of content identifiers for corresponding user accounts at a client device, wherein the user-defined lists of content identifiers define collections of recorded audio and video works for respective ones of the user accounts;

receiving user input identifying permitted social group members for the authorized user, and transmitting identifiers for the permitted social group members to a server for developing social group information for an authorized user:

arranging a matrix of images representing contents of one of the user-defined lists of content identifiers for the authorized user, so that each image in the matrix corresponds to a different one of the content identifiers and size of each image in the matrix depends on a popularity score for each content identifier, being a measure of relative frequency with which a corresponding one of the content identifiers appears in the user-defined content lists;

arranging the matrix of images depending on each popularity score, wherein the popularity score is at least one of: (a) a measure of relative frequency with which a corresponding one of the content identifiers appears in the user-defined content lists for permitted social group members of the authorized user only, or (b) a measure of relative frequency with which a corresponding one of the content identifiers appears in the user-defined content lists for other users in addition to permitted social group members of the authorized user; and outputting information for display of a user interface on the client device, the interface comprising the matrix of images.

12. The method of claim 11, further comprising identifying suggested new content that is not identified on the one of the user-defined lists for the authorized user account and is identified on similar ones of the user-defined content lists maintained for permitted social group members of the authorized user.

13. The method of claim 11, further comprising providing an option in the user interface for the authorized user to view the user-defined content lists for the permitted social group members.

14. The method of claim 13, further comprising displaying similarity scores for each of the permitted social group members relative to the authorized user, wherein the similarly scores measure similarity between the user-defined content lists for each of the permitted social group members and the user-defined content list for the authorized user.

15. The method of claim 11, further comprising augmenting the one of the user-defined lists of content identifiers for the authorized user, in response to user input indicating addition or removal of a recorded audio or video work.

16. The method of claim 11, further comprising responding to user selection of an image in the matrix of images to display further information about a recorded audio or video work indicated by the selection of the image.

17. The method of claim 11, wherein each image in the matrix comprises a substantially rectangular two-dimensional image and the matrix of images comprises a tiled arrangement of the rectangular images each sized in accordance with its corresponding numeric score.

18. An apparatus comprising a processor coupled to a memory, the memory holding instructions for:

receiving user-defined lists of content identifiers for corresponding user accounts at a client device, wherein the user-defined lists of content identifiers define collections of recorded audio and video works for respective ones of the user accounts;

receiving user input identifying permitted social group members for an authorized user, and transmitting identifiers for the permitted social group members to a server for developing social group information for the authorized user;

arranging a matrix of images representing contents of one of the user-defined lists of content identifiers for the authorized user, so that each image in the matrix corresponds to a different one of the content identifiers and size of each image in the matrix depends on a popularity score for each content identifier, being a measure of relative frequency with which a corresponding one of the content identifiers appears in the user-defined content lists;

arranging the matrix of images depending on each popularity score, wherein the popularity score is at least one of: (a) a measure of relative frequency with which a corresponding one of the content identifiers appears in the user-defined content lists for permitted social group members of the authorized user only, or (b) a measure of relative frequency with which a corresponding one of the content identifiers appears in the user-defined content lists for other users in addition to permitted social group members of the authorized user; and outputting information for display of a user interface on the client device, the interface comprising the matrix of images.

19. The apparatus of claim 18, wherein the memory further holds instructions for identifying suggested new content that is not identified on the one of the user-defined lists for the authorized user account and is identified on similar ones of the user-defined content lists maintained for permitted social group members of the authorized user.

20. The apparatus of claim 18, wherein the memory further holds instructions for providing an option in the user interface for the authorized user to view the user-defined content lists for the permitted social group members.

21. The apparatus of claim 20, wherein the memory further holds instructions for displaying similarity scores for each of the permitted social group members relative to the authorized user, wherein the similarly scores measure similarity between the user-defined content lists for each of the permitted social group members and the user-defined content list for the authorized user.

22. The apparatus of claim 18, wherein the memory further holds instructions for augmenting the one of the user-defined lists of content identifiers for the authorized user, in response to user input indicating addition or removal of a recorded audio or video work.

23. The apparatus of claim 18, wherein the memory further holds instructions for responding to user selection of an image in the matrix of images to display further information about a recorded audio or video work indicated by the selection of the image.

24. The apparatus of claim 18, wherein the memory further holds instructions for preparing each image in the matrix to comprise a substantially rectangular two-dimensional image and to arrange the matrix of images as a tiled arrangement of the rectangular images each sized in accordance with its corresponding numeric score.

* * * * *